United States Patent [19]

Shibata et al.

[11] Patent Number: 5,589,992

[45] Date of Patent: Dec. 31, 1996

[54] MAGNETIC RECORDING AND REPRODUCING APPARATUS FOR PERFORMING SLOW-MOTION REPRODUCTION WITH HIGHER QUALITY OF IMAGE

[75] Inventors: Hideyo Shibata, Neyagawa; Ritsuro Kinoshita, Hirakata; Takayasu Yoshida, Osaka; Shigeo Eshima, Otokuni-gun, all of Japan

[73] Assignee: Matsushita Electric Industrial Co., Ltd., Kadoma, Japan

[21] Appl. No.: 285,282

[22] Filed: Aug. 3, 1994

[30] Foreign Application Priority Data

Aug. 4, 1993  [JP]  Japan .................................. 5-193427
Mar. 29, 1994 [JP]  Japan .................................. 6-057916
Mar. 29, 1994 [JP]  Japan .................................. 6-057918

[51] Int. Cl.$^6$ ................................................ H04N 5/78
[52] U.S. Cl. .............................. 386/72; 360/27; 360/64
[58] Field of Search ................................. 360/9.1, 10.1, 360/10.2, 10.3, 18, 27, 29, 33.1, 61, 64; 358/335, 338, 312

[56] References Cited

U.S. PATENT DOCUMENTS

| | | | |
|---|---|---|---|
| 4,139,867 | 2/1979 | Foerster | 360/10 |
| 4,796,123 | 1/1989 | Takeuchi et al. | 360/10.1 |
| 4,800,447 | 1/1989 | Toba | 360/10.3 |
| 4,864,430 | 9/1989 | Yoshimura et al. | 360/10.2 |
| 4,870,510 | 9/1989 | Edakubo et al. | 360/27 |
| 4,873,587 | 10/1989 | Yoshimura et al. | 360/9.1 |

FOREIGN PATENT DOCUMENTS

| | | |
|---|---|---|
| 55-132178 | 1/1981 | Japan . |
| 63-003582 | 6/1988 | Japan . |
| 63-187981 | 12/1988 | Japan . |
| 03036887 | 4/1991 | Japan . |

*Primary Examiner*—Andrew L. Sniezek
*Attorney, Agent, or Firm*—McDermott, Will & Emery

[57] ABSTRACT

In a magnetic recording and reproducing apparatus for reproducing a video signal recorded on a video track of a magnetic tape by pair of magnetic heads arranged in a rotation drum so as to oppose to each other at an angle of 180 degrees, while rotating a capstan for moving the magnetic tape in the longitudinal direction, a memory controller controls the reproduced video signal to be written into and be read out from two memories, each of which stores a video signal of at least one field. Then, a quality of image judgment circuit judges a part of the reproduced video signal having a quality of image higher than a predetermined threshold quality level, among a plurality of parts of the reproduced video signal obtained through scan of a pair of magnetic heads. In a slow-motion reproduction, the memory control circuit controls the part of the reproduced video signal having the higher quality of image to be written into one of the two memories, whereas the memory control circuit simultaneously controls a further reproduced video signal to be read out from another one of the two memories.

24 Claims, 18 Drawing Sheets

301 Running Direction of Magnetic Tape
129
Scanning Direction 302 of Magnetic Head
311
1TP 301
129
302
312

301
129
302
313

301
129
302
129 314

Reproduced RF Video Signal 128

311r  312r  313r  314r  128

Head Pair Switching Signal 111

→ t

Reproduced RF Video Signal 128

Head Pair Switching Signal 111

Quality of Image Judgment Signal 118a

→ t

Still Reproduction

Scanning Direction of Magnetic Head

1/n-time Speed Reproduction

Scanning Direction of Magnetic Head

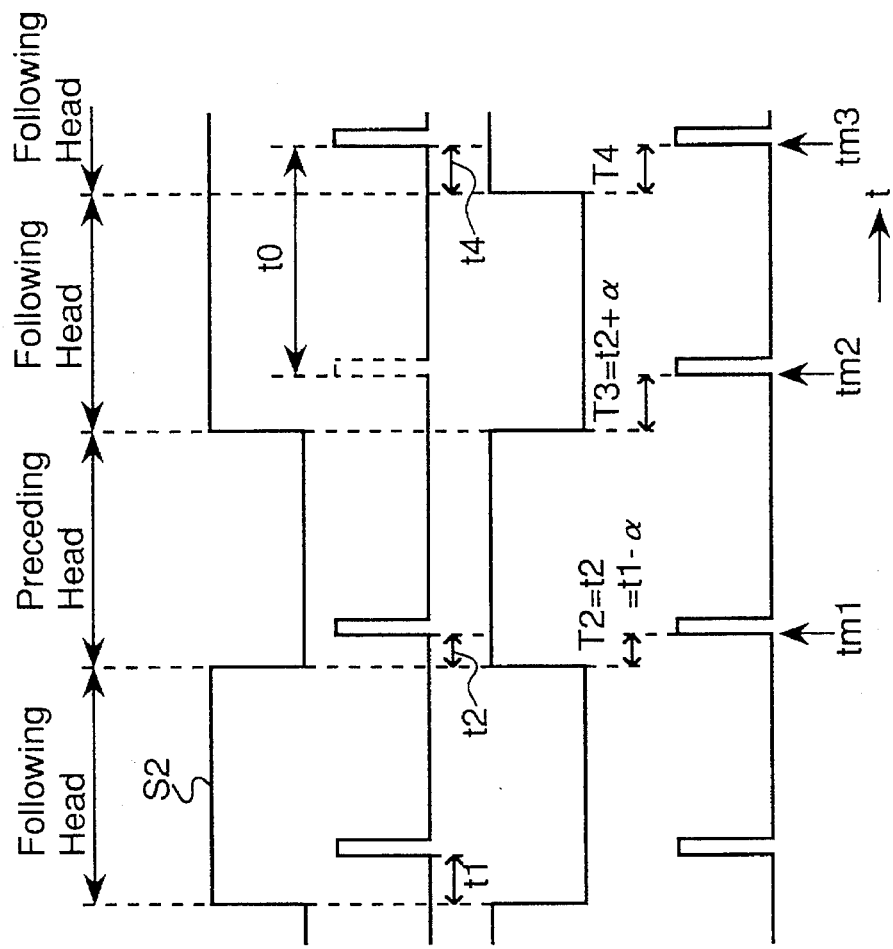

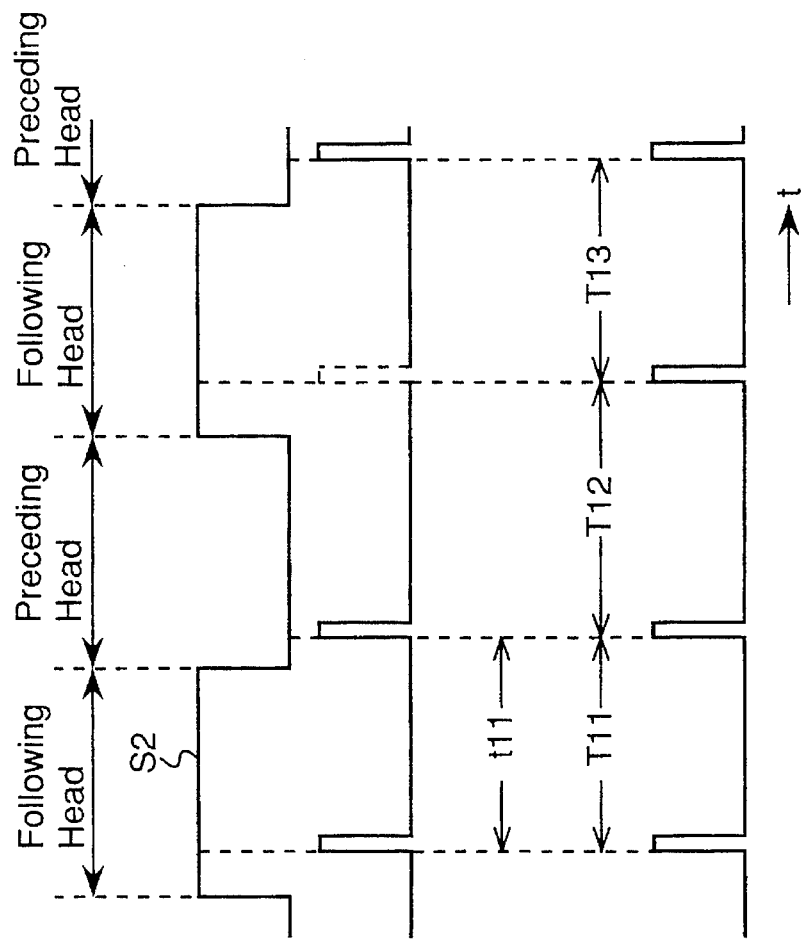

Reproduced
RF Video
Signal 128

Optimum Field
Judgment Result
Signal 137

Head Pair Switching
Signal 111

Control Signal 119

CAP-FG Signal 120

Preceding and
Following Heads
Switching Signal 112

Memory Switching
Signal 138

CAP-FG
Counter 139

Reproduced RF
Video Signal 128

Optimum Field
Judment Result Signal
137 tm11  tm13  tm14    tm15
   tm12

*Fig.14A*
Head Pair Switching
Signal 111
*Fig.14B*
Control Signal 119
*Fig.14C*
CAP-FG Signal 120
*Fig.14D*
CAP-FG
Counter 139
*Fig.14E*
Memory Switching
Signal 138
*Fig.14F*
Reproduced RF
Video Signal 128
*Fig.14G*
Optimum Field
Judment Result Signal
137
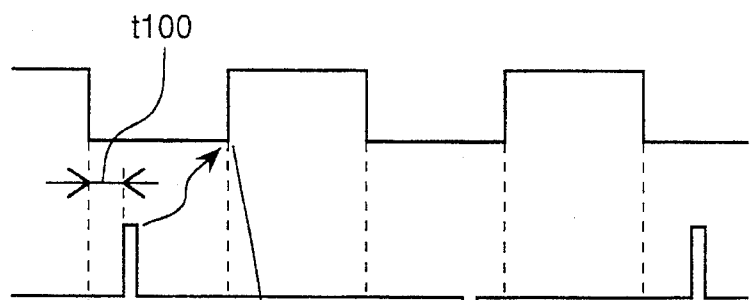
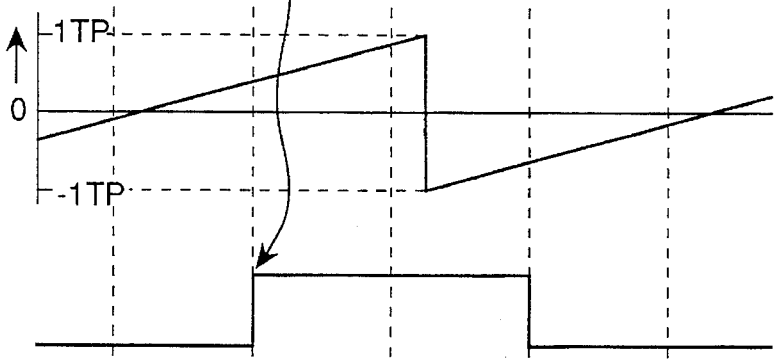
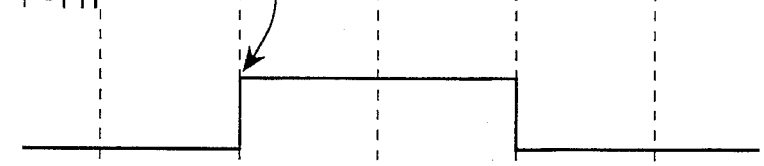
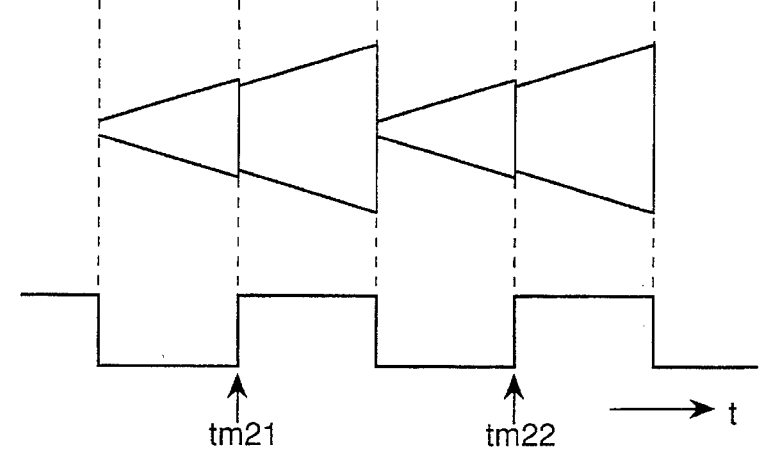
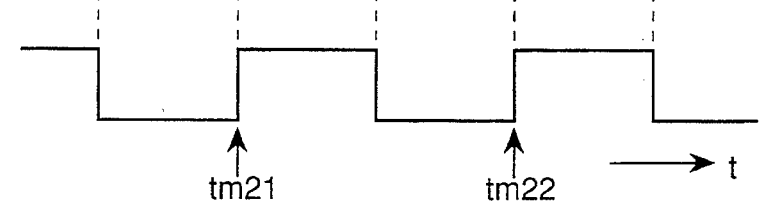

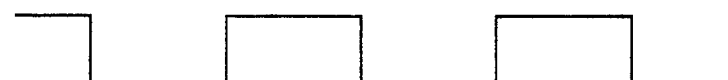
Fig.15A
Head Pair Switching
Signal 111
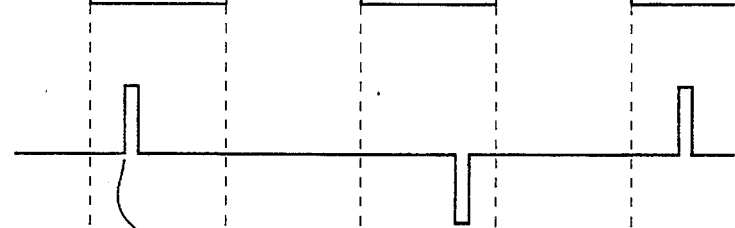
Fig.15B
Control Signal 119
Fig.15C
CAP-FG Signal 120
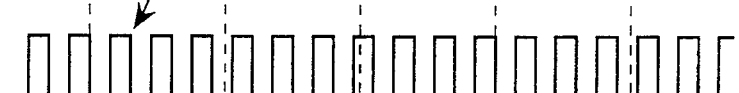
Fig.15D
CAP-FG
Counter 139
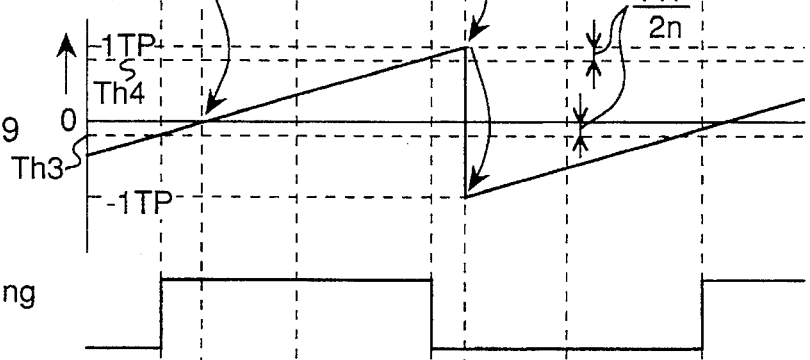
Fig.15E
Memory Switching
Signal 138
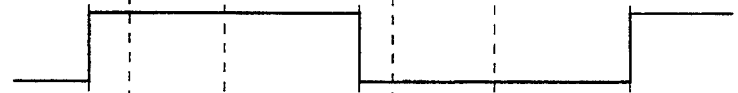
Fig.15F
Reproduced RF
Video Signal 128
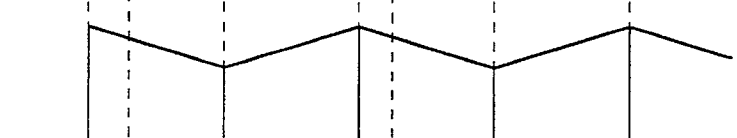
Fig.15G
Optimum Field
Judment Result Signal
137
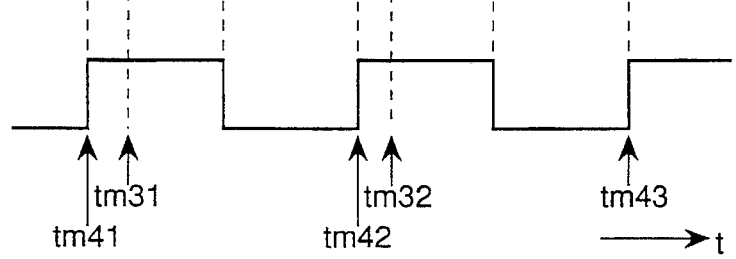

Fig. 17A  Still Reproduction
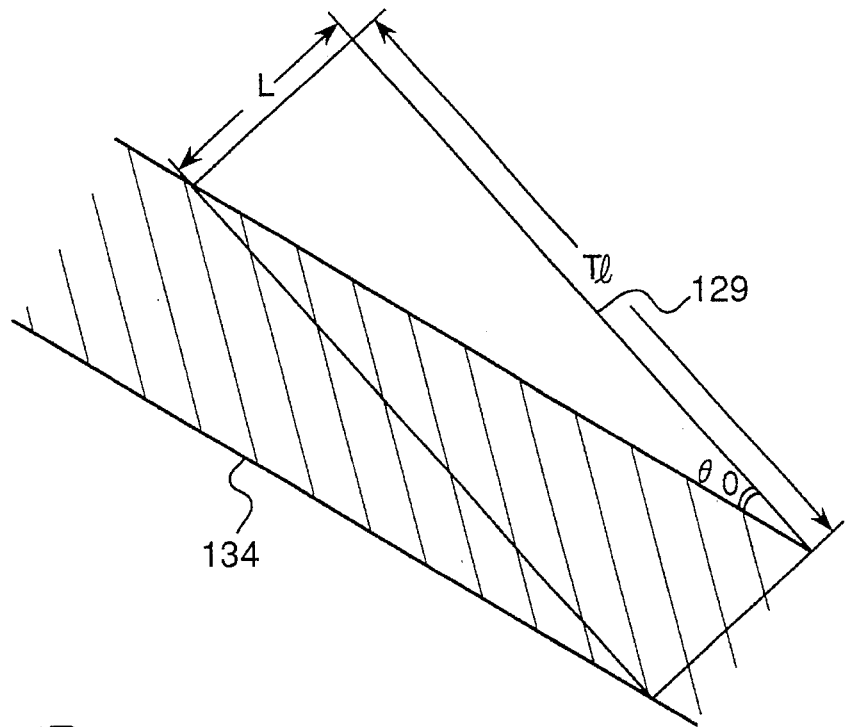
Fig. 17B  1/n-time Speed Reproduction
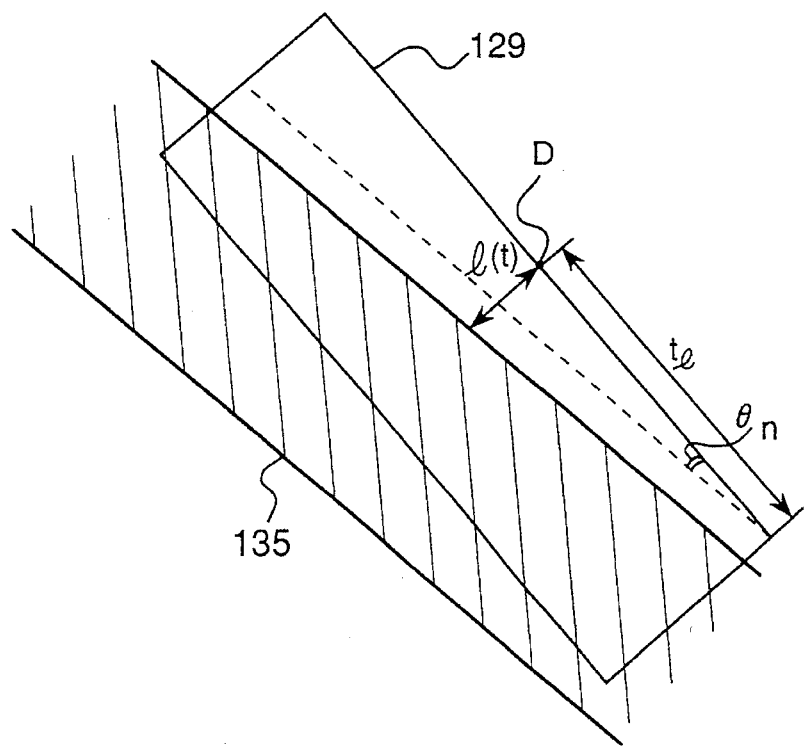

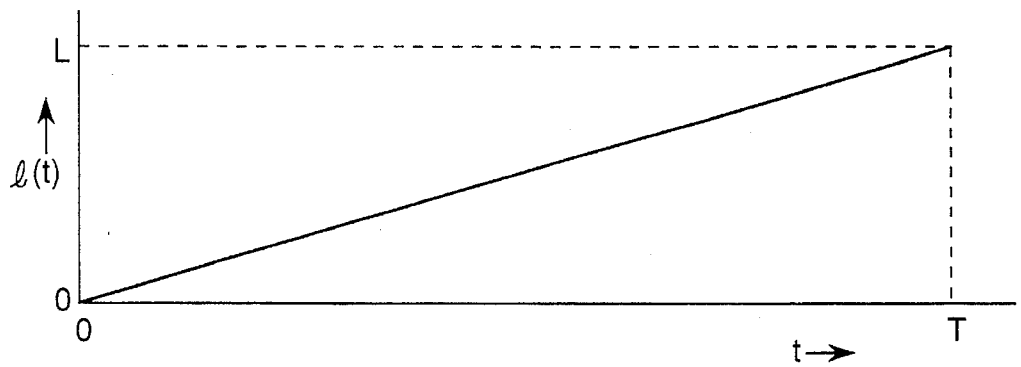
Fig. 18A  Pattern PA
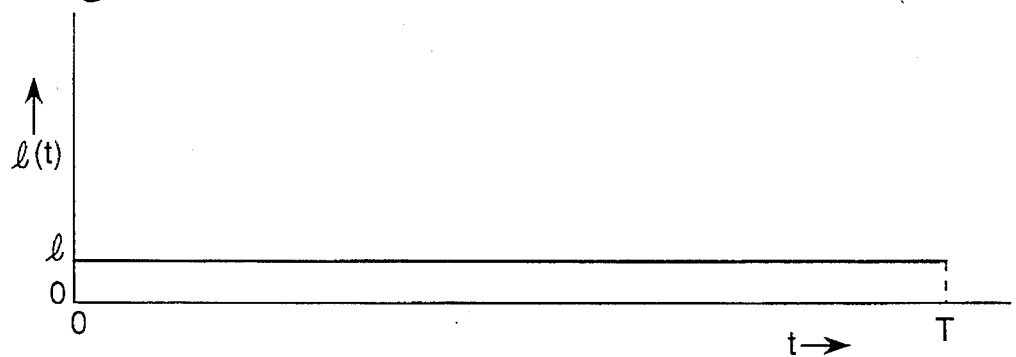
Fig. 18B  Pattern PB
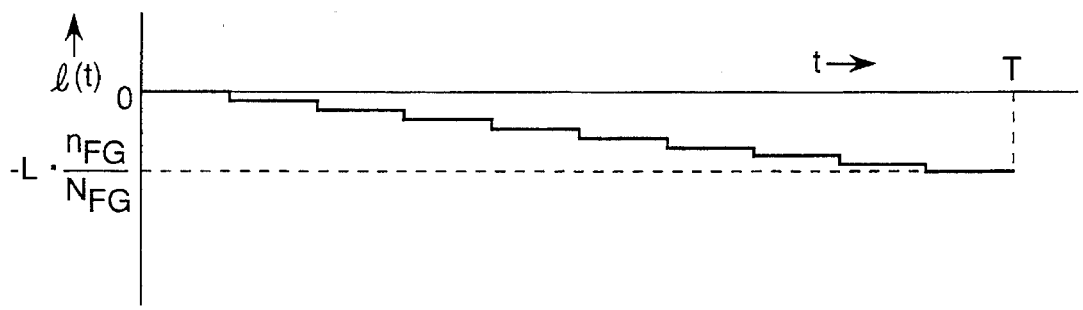
Fig. 18C  Pattern PC
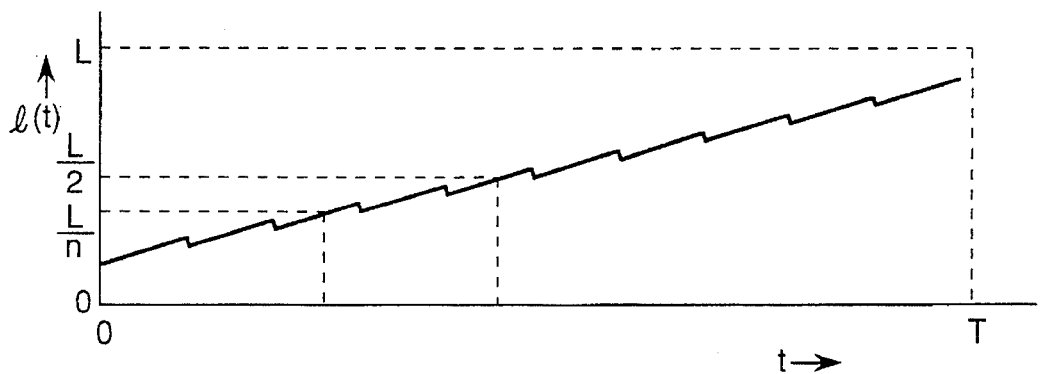
Fig. 18D  Pattern PD

MAGNETIC RECORDING AND REPRODUCING APPARATUS FOR PERFORMING SLOW-MOTION REPRODUCTION WITH HIGHER QUALITY OF IMAGE

BACKGROUND OF THE INVENTION

1. Field of the Invention

The present invention relates to a magnetic recording and reproducing apparatus such as a VTR (Video Tape Recorder), and in particular, to a magnetic recording and reproducing apparatus performing a slow-motion reproduction so as to reproduce a higher quality of image.

2. Description of the Related Art

In recent years, a magnetic recording and reproducing apparatus has been used not only in executing normal recording and reproducing operations but also in analyzing an image or producing a software tape through a special reproducing process, which has also accompanied a growing trend of attaching importance to the quality of a specially reproduced image.

In a magnetic recording and reproducing apparatus most widely used using a magnetic tape (the magnetic recording and reproducing apparatus is referred to as a VTR hereinafter), a magnetic tape is wound around a rotating drum mounted together with magnetic heads, and a video signal is recorded onto a video track inclined at a specified angle with respect to the longitudinal direction of a magnetic tape. Such a VTR is referred to as a helical scan type VTR hereinafter.

When a slow-motion reproduction is executed in the helical scan type VTR, the inclination of a recorded video track does not coincide with a scanning trace of the magnetic head. This results in a deviation or shift amount on the time of a video signal, or a deteriorated signal-to-noise ratio in a part of the resulting image. Therefore, in order to obtain a stabilized slow-motion image in a simpler manner, it is required to repeat reproduction of a still image by intermittently feeding the magnetic tape periodically, or periodically stopping the moved magnetic tape. Further, in order to obtain a perfect slow-motion image having a higher quality, it is required to move the magnetic head mounted on the rotating drum in a direction perpendicular to the direction of rotation of the rotating drum and to effect control so as to correctly scan the recorded video track on the magnetic tape.

FIG. 16 shows a reproducing system of a conventional helical scan type VTR having a head driving mechanism 1605 for moving the magnetic head.

Referring to FIG. 16, 1601 denotes a magnetic tape, and the reproducing system of the conventional VTR comprises a magnetic head 1602, a preamplifier 1603, a video signal reproducing circuit 1604, the head driving mechanism 1605, a head driving circuit 1606, a level detecting circuit 1607, and a controller 1608.

When a slow-motion reproduction is executed in the conventional VTR shown in FIG. 16, a RF (radio frequency) video signal recorded on the magnetic tape 1601 is reproduced by the magnetic head 1602, and the resulting reproduced RF video signal is amplified by the preamplifier 1603, and then, the amplified RF video signal is demodulated so as to obtain a reproduced video signal. On the other hand, the level detecting circuit 1607 converts the RF video signal outputted from the preamplifier 1603 into an output signal representing the signal level of the RF video signal. Then the controller 1608 generates a control signal for controlling the height of the magnetic head 1602 to be arranged so that the level of the output signal from the level detecting circuit 1607 becomes the maximum, and outputs the control signal for therefor through the head driving circuit 1606 to the head driving mechanism 1605 so as to move the magnetic head 1602 mounted on the rotating drum in a direction perpendicular to the direction of rotation of the drum by means of the head driving mechanism 1605 mounted with the magnetic head 1602. Consequently, the magnetic head 1602 correctly scan the recorded video track on the magnetic tape 1601.

Since the magnetic head 1602 is moved by a special mechanism in the above-mentioned conventional VTR, the cost of the conventional VTR becomes higher, and also it becomes difficult to heighten the reliability thereof. Further, when a slow-motion reproduction is executed in the simple way of intermittently feeding the magnetic tape, noise is generated in the slow-motion reproduction of the reverse direction. Furthermore, since the intermittent feed of the magnetic tape cannot be performed so quickly, there is a limitation in the speed to about one fifth of the normal reproduction speed.

SUMMARY OF THE INVENTION

The present invention is intended to resolve the above-mentioned problems, and accordingly, an essential object of the present invention is to provide magnetic recording and reproducing apparatus capable of performing a slow-motion reproduction at a relatively high speed without employing any magnetic head having a special movement mechanism.

Another object of the present invention is to provide a magnetic recording and reproducing apparatus capable of performing a slow-motion reproduction at at least a ½-time speed without employing any magnetic head having a special movement mechanism.

A further object of the present invention is provide a magnetic recording and reproducing apparatus capable of performing a slow-motion reproduction so as to obtain a higher quality of image without employing any magnetic head having a special movement mechanism.

A still further object of the present invention is to provide a magnetic recording and reproducing apparatus capable of performing a stabilized slow-motion reproduction without employing any magnetic head having a special movement mechanism.

According to one aspect of the present invention, there is provided a magnetic recording and reproducing apparatus for reproducing a video signal recorded on a video track of a magnetic tape by means of a pair of magnetic heads arranged in a rotation drum so as to oppose to each other at an angle of 180 degrees, while rotating a capstan for moving said magnetic tape in the longitudinal direction thereof, comprising:

two memories each for storing a video signal of at least one field;

memory control means for controlling the reproduced video signal to be written into and be read out from said two memories;

reproduced video signal supply means for supplying a reproduced video signal reproduced from the magnetic tape by means of said pair of magnetic heads to said two memories; and quality of image judgment means for judging a part of said reproduced video signal having a quality of image higher than a predetermined threshold quality level, among a plurality of parts of said reproduced video signal obtained through scan of said pair of magnetic heads, and supplying a quality of image judgment signal representing the part of said reproduced video signal having the higher quality of image;

wherein, when said capstan continuously feeds the magnetic tape in a forward or reverse direction at a speed slower than a normal reproduction speed, said memory control means controls the part of the reproduced video signal having the higher quality of image to be written into one of said two memories, whereas said memory control means simultaneously controls a further reproduced video signal to be read out from another one of said two memories.

The above-mentioned arrangement allows slow-motion reproduction having a higher quality of image to be achieved without employing any magnetic head having a special movement mechanism.

In the above-mentioned magnetic recording and reproducing apparatus, said quality of image judgment means preferably determines the portion of the reproduced video signal having the higher quality of image, by judging whether or not the reproduced video signal has a level larger than a predetermined threshold level.

The above-mentioned magnetic recording and reproducing apparatus preferably further comprises:

control signal reproducing means for reproducing a control signal recorded on the magnetic tape; and capstan frequency generating signal generating means for generating a capstan frequency generating signal in synchronous with rotation of said capstan;

wherein said quality of image judgment means comprises:

means for calculating a shift amount between the video track and a scanning trace of each of said pair of magnetic heads based on a head pair switching signal for switching over between said pair of magnetic heads, and said capstan frequency generating signal generated by said capstan frequency generating signal generating means; and means for determining the part of said reproduced video signal having the higher quality of image by judging whether or not the shift amount between the video track and the scanning trace of each of said pair of magnetic heads which is calculated by said calculating means is smaller than a predetermined threshold value.

In the above-mentioned magnetic recording and reproducing apparatus, video signals recorded on adjacent video tracks are preferably reproduced respectively by means of a pair of magnetic heads having azimuth angles different from each other, and wherein said reproduced video signal supply means supplies to either one of said two memories the reproduced video signal on the video track reproduced by each of said pair of magnetic heads having the same azimuth angle as that of the video track to be scanned among said pair of magnetic heads.

In the above-mentioned magnetic recording and reproducing apparatus, one of said pair of magnetic heads preferably includes a first head having a first azimuth angle and a second head having a second azimuth angle different from the first azimuth angle, said first and second heads being mounted on said rotation drum so that said second head is positioned so as to precede said first head, wherein another one of said pair of magnetic heads includes a third head having the first azimuth angle and a fourth head having the second azimuth angle, said third and fourth heads being mounted on said rotation drum so that said third head is positioned so as to oppose to said second head at an angle of 180 degrees and said fourth head is positioned so as to oppose to said first head at an angle of 180 degrees, said magnetic recording and reproducing apparatus comprising:

preceding and following heads switching signal generating means for generating a preceding and following heads switching signal for switching over between a pair of preceding heads including said second and third heads and a pair of following heads including said first and fourth heads; and selecting means for selecting one of the video signals respectively reproduced by said first, second, third and fourth heads, and supplying the selected video signal to said two memories;

wherein, in response to a combination of azimuth information of the video track to be scanned and said head pair switching signal, said selecting means controls said preceding and following heads switching signal generating means to generate said preceding and following heads switching signal so that the video signal reproduced by the magnetic head having the same azimuth angle as that of the video track to be scanned.

In the above-mentioned magnetic recording and reproducing apparatus, the video signal recorded on the video track of the magnetic tape preferably includes a first field and a second field, wherein said two memories include a first memory and a second memory, said magnetic recording and reproducing apparatus comprising:

framing detection means for detecting whether the reproduced video signal is of the first field or the second field and supplying a signal representing the detection result, wherein said memory control means allows the reproduced video signal to be written into the first field memory when it is detected by said framing detection means that the reproduced video signal is of the first field, whereas said memory control means allows the reproduced video signal to be written into the second field memory when it is detected by said framing detection means that the reproduced video signal is of the second field.

In the above-mentioned magnetic recording and reproducing apparatus, when the detection result of said framing detection means is changed in scanning the same video track, the framing detection means preferably prohibits the change of the detection result of the framing detection means until the video track being scanned is changed, and inverts the detection result thereof when the video track being scanned is changed.

The above-mentioned magnetic recording and reproducing apparatus preferably further comprises:

synchronizing signal separating means for separating a vertical synchronizing signal from the reproduced video signal and supplying the separated vertical synchronizing signal to said memory control means; and memory read reference signal supply means for generating and supplying to said memory control means, a memory read reference signal periodically in synchronous with said vertical synchronizing signal;

wherein said memory control means controls the reproduced video signal to be written to said two memories based on the vertical synchronizing signal separated by said vertical synchronizing signal generating means, and simultaneously controls the reproduced video signal to be read out from said two memories based on said memory read reference signal.

In the above-mentioned magnetic recording and reproducing apparatus, said memory read reference signal preferably includes a first signal representing that the reproduced video signal is of the first field and a second signal representing that the reproduced video signal is of the second field, wherein said memory control means comprises read control means for controlling a timing for reading out the reproducing video signal from said two memories with reference to said memory read reference signal, to be shifted by one period of the horizontal synchronizing signal, based on a combination of the field of the reproduced video signal and the first or second signal of the memory read reference signal.

The magnetic recording and reproducing apparatus preferably further comprises:

synchronizing signal separating means for separates a vertical synchronizing signal from the reproduced video signal and supplying the separated vertical synchronizing signal to said memory control means;

vertical synchronizing signal missing judgment means for judging whether or not the vertical synchronizing signal separated by said synchronizing signal separating means is missing; and memory write reference signal generating means for generating a memory write reference signal as a reference when writing the reproduced video signal into said two memories and supplying the memory write reference signal to said memory control means;

wherein said memory write reference signal generating means outputs the vertical synchronizing signal as the memory write reference signal when said vertical synchronizing signal missing judgment means judges that the vertical synchronizing signal is not missing, whereas said memory write reference signal generating means generates the memory write reference signal using the head pair switching signal as a reference based on:

(a) a time difference between the vertical synchronizing signal detected in a previous time and the head pair switching signal in the previous time, (b) a polarity of the preceding and following heads switching signal in the previous time, (c) the current preceding and following heads switching signal, and (d) a reproduction time difference generated due to a positional difference between the first and second heads, when said vertical synchronizing signal missing judgment means judges that the vertical synchronizing signal is missing.

In the above-mentioned magnetic recording and reproducing apparatus, when said vertical synchronizing signal missing judgment means judges that the vertical synchronizing signal is missing, said memory write reference signal generating means preferably generates the memory write reference signal using a previously detected vertical synchronizing signal as a reference based on:

(a) a time difference between the adjacent two vertical synchronizing signals at a timing when the consecutive two vertical synchronizing signals are detected, (b) a polarity of the preceding and following heads switching signal in said timing, (c) the current preceding and following heads switching signal, and (d) a reproduction time difference generated due to the positional difference between the first and second heads.

According to another aspect of the present invention, there is provided a magnetic recording and reproducing apparatus for reproducing a video signal recorded on a video track of a magnetic tape by means of a pair of magnetic heads arranged in a rotation drum so as to oppose to each other at an angle of 180 degrees, while rotating a capstan for moving said magnetic tape in the longitudinal direction thereof, comprising:

two memories each for storing a video signal of at least one field;

memory control means for controlling the reproduced video signal to be written into and be read out from said two memories;

reproduced video signal supply means for supplying a reproduced video signal reproduced from the magnetic tape by means of said pair of magnetic heads to said two memories;

control signal reproducing means for reproducing a control signal for tracking control recorded on the magnetic tape;

capstan frequency generating signal generating means for generating a capstan frequency generating signal in synchronous with rotation of said capstan; and optimum field judgment means for calculating a shift amount between the video track and a scanning trace of each of said pair of magnetic heads based on a head pair switching signal for switching over between said pair of magnetic heads, said control signal and said capstan frequency generating signal, judging a time interval including a timing when the scanning trace of each of said pair of magnetic heads coincides with the video track in the vicinity of the center of the video track based on the calculated shift amount, and supplying a judgment signal representing the time interval;

wherein, when the magnetic tape is continuously moved in a forward or reverse direction at a speed slower than a normal reproduction speed, said memory control means controls the reproduced video signal of one field to be written into one of said two memories for the time interval represented by the judgment signal supplied by said optimum field judgment means, whereas said memory control means simultaneously controls the reproduced video signal of another one field to be read out from another one of said two memories.

The above-mentioned arrangement allows slow-motion reproduction having a higher quality of image to be achieved without employing any magnetic head having a special movement mechanism even when rotation of the rotation drum and rotation of the capstan are out of phase.

In the above-mentioned magnetic recording and reproducing apparatus, video signals recorded on adjacent video tracks are preferably reproduced respectively by means of a pair of magnetic heads having azimuth angles different from each other, and wherein said reproduced video signal supply means supplies to either one of said two memories the reproduced video signal on the video track reproduced by each of said pair of magnetic heads having the same azimuth angle as that of the video track to be scanned among said pair of magnetic heads.

In the above-mentioned magnetic recording and reproducing apparatus, one of said pair of magnetic heads preferably includes a first head having a first azimuth angle and a second head having a second azimuth angle different from the first azimuth angle, said first and second heads being mounted on said rotation drum so that said second head is positioned so as to precede said first head, wherein another one of said pair of magnetic heads includes a third head having the first azimuth angle and a fourth head having the second azimuth angle, said third and fourth heads being mounted on said rotation drum so that said third head is positioned so as to oppose to said second head at an angle of 180 degrees and said fourth head is positioned so as to oppose to said first head at an angle of 180 degrees, said magnetic recording and reproducing apparatus comprising:

preceding and following heads switching signal generating means for generating a preceding and following heads switching signal for switching over between a pair of preceding heads including said second and third heads and a pair of following heads including said first and fourth heads; and selecting means for selecting one of the video signals respectively reproduced by said first, second, third and fourth heads, and supplying the selected video signal to said two memories;

wherein, in response to a combination of azimuth information of the video track to be scanned and said head pair switching signal, said selecting means controls said preceding and following heads switching signal generating means to generate said preceding and following heads switching signal so that the video signal reproduced by the magnetic head having the same azimuth angle as that of the video track to be scanned.

In the above-mentioned magnetic recording and reproducing apparatus, the video signal recorded on the video track of the magnetic tape preferably includes a first field and a second field, wherein said two memories include a first memory and a second memory, said magnetic recording and reproducing apparatus comprising:

framing detection means for detecting whether the reproduced video signal is of the first field or the second field and supplying a signal representing the detection result, wherein said memory control means allows the reproduced video signal to be written into the first field memory when it is detected by said framing detection means that the reproduced video signal is of the first field, whereas said memory control means allows the reproduced video signal to be written into the second field memory when it is detected by said framing detection means that the reproduced video signal is of the second field.

In the above-mentioned magnetic recording and reproducing apparatus, when the detection result of said framing detection means is changed in scanning the same video track, the framing detection means preferably prohibits the change of the detection result of the framing detection means until the video track being scanned is changed, and inverts the detection result thereof when the video track being scanned is changed.

The above-mentioned magnetic recording and reproducing apparatus preferably further comprises:

synchronizing signal separating means for separating a vertical synchronizing signal from the reproduced video signal and supplying the separated vertical synchronizing signal to said memory control means; and memory read reference signal supply means for generating and supplying to said memory control means, a memory read reference signal periodically in synchronous with said vertical synchronizing signal;

wherein said memory control means controls the reproduced video signal to be written to said two memories based on the vertical synchronizing signal separated by said vertical synchronizing signal generating means, and simultaneously controls the reproduced video signal to be read out from said two memories based on said memory read reference signal.

In the above-mentioned magnetic recording and reproducing apparatus, said memory read reference signal preferably includes a first signal representing that the reproduced video signal is of the first field and a second signal representing that the reproduced video signal is of the second field, wherein said memory control means comprises read control means for controlling a timing for reading out the reproducing video signal from said two memories with reference to said memory read reference signal, to be shifted by one period of the horizontal synchronizing signal, based on a combination of the field of the reproduced video signal and the first or second signal of the memory read reference signal.

The above-mentioned magnetic recording and reproducing apparatus preferably further comprises:

synchronizing signal separating means for separates a vertical synchronizing signal from the reproduced video signal and supplying the separated vertical synchronizing signal to said memory control means; and vertical synchronizing signal missing judgment means for judging whether or not the vertical synchronizing signal separated by said synchronizing signal separating means is missing;

wherein said memory control means controls the reproduced video signal to be written into one of said two memories only when said vertical synchronizing signal missing judgment means judges that the vertical synchronizing signal is not missing.

The above-mentioned magnetic recording and reproducing apparatus preferably further comprises:

synchronizing signal separating means for separates a vertical synchronizing signal from the reproduced video signal and supplying the separated vertical synchronizing signal to said memory control means;

vertical synchronizing signal missing judgment means for judging whether or not the vertical synchronizing signal separated by said synchronizing signal separating means is missing; and memory write reference signal generating means for generating a memory write reference signal as a reference when writing the reproduced video signal into said two memories and supplying the memory write reference signal to said memory control means;

wherein said memory write reference signal generating means outputs the vertical synchronizing signal as the memory write reference signal when said vertical synchronizing signal missing judgment means judges that the vertical synchronizing signal is not missing, whereas said memory write reference signal generating means generates the memory write reference signal using the head pair switching signal as a reference based on:

(a) a time difference between the vertical synchronizing signal detected in a previous time and the head pair switching signal in the previous time, (b) a polarity of the preceding and following heads switching signal in the previous time, (c) the current preceding and following heads switching signal, and (d) a reproduction time difference generated due to a positional difference between the first and second heads, when said vertical synchronizing signal missing judgment means judges that the vertical synchronizing signal is missing.

In the above-mentioned magnetic recording and reproducing apparatus, when said vertical synchronizing signal missing judgment means judges that the vertical synchronizing signal is missing, said memory write reference signal generating means preferably generates the memory write reference signal using a previously detected vertical synchronizing signal as a reference based on:

(a) a time difference between the adjacent two vertical synchronizing signals at a timing when the consecutive two vertical synchronizing signals are detected, (b) a polarity of the preceding and following heads switching signal in said timing, (c) the current preceding and following heads switching signal, and (d) a reproduction time difference generated due to the positional difference between the first and second heads.

The above-mentioned magnetic recording and reproducing apparatus preferably further comprises:

capstan frequency generating signal generating means for generating a capstan frequency generating signal in synchronous with rotation of said capstan; and a counter for counting the capstan frequency generating signal generated by said capstan frequency generating signal generating means and outputting the count value thereof;

wherein said memory control means controls the reproduced video signal to be written into each of said two memories for one field from a timing when the count value of said counter is equal to or larger than either one of:

(a) $(TP/2)-(TP/n)-\beta$, and (b) $-(TP/2)-(TP/n)-\beta$, at a first timing from an edge of a head pair switching signal for switching over between said pair of magnetic heads, where TP is the count value of said counter for a time interval of one track pitch which is a distance in the longitudinal direction of the magnetic tape between adjacent video tracks, 1/n is the number of times of the tape speed in a slow-motion reproduction as compared from the tape speed of a normal reproduction, and $\beta$ is a constant determined depending on the number 1/n of the times of the tape speed in the slow-motion reproduction.

The above-mentioned magnetic recording and reproducing apparatus preferably further comprises:

control signal reproducing means for reproducing a control signal for tracking control recorded on the magnetic tape;

wherein said counter is reset to zero at a first timing of an edge of the capstan frequency generating signal after the control signal is reproduced, and said counter is set from 1TP to −1TP when the capstan frequency generating signal of one track pitch has been generated by said capstan frequency signal generating means after said counter is reset to zero, and wherein said memory control means controls the reproduced video signal to be written into each of said two memories for one field at the timing determined based on the count value of said counter.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 9A, 9B, 9C and 9D are timing charts showing a relationship among a preceding and following heads switching signal 112, a vertical synchronizing signal 134, a head pair switching signal 111, and a memory write reference signal 135 in the VTR shown in FIG. 1;

FIGS. 10A, 10B and 10C are timing charts showing a relationship among a preceding and following heads switching signal 112, a vertical synchronizing signal 134, and a memory write reference signal 135 in a modification of the VTR shown in FIG. 1;

FIGS. 14A, 14B, 14C, 14D, 14E, 14F and 14G are timing charts showing a relationship among a head pair switching signal 111, a control signal 119 for tracking control, a CAP-FG (capstan frequency generating) signal 120, a count of a CAP-FG (capstan frequency generating) counter 139, a memory switching signal 138, a reproduced RF signal 128, and an optimum field judgment result signal 137 in the ½-time speed reproduction of the VTR shown in FIG. 11;

FIGS. 15A, 15B, 15C, 15D, 15E, 15F and 15G are timing charts showing a relationship among a head pair switching signal 111, a control signal 119 for tracking control, a CAP-FG (capstan frequency generating) signal 120, a count of a CAP-FG (capstan frequency generating) counter 139, a memory switching signal 138, a reproduced RF signal 128, and an optimum field judgment result signal 137 in the ½-time speed reproduction of an improved modification of the VTR shown in FIG. 11;

FIG. 17A is a front view showing a video track 129 and a scanning trace 134 of a magnetic head in a still reproduction of the VTR shown in FIG. 1;

FIG. 17B is a front view showing a video track 129 and a scanning trace 135 of a magnetic head in a 1/n-time speed reproduction of the VTR shown in FIG. 1;

FIG. 18A is a graph showing a first patten PA of a relationship between a distance between an upper end of a video track and a scanning trace of a magnetic end, and an elapsed time from a start end of the video track, in a first modification of the VTR shown in FIG. 1;

FIG. 18B is a graph showing a second patten PB of a relationship between a distance between an upper end of a video track and a scanning trace of a magnetic end, and an elapsed time from a start end of the video track, in a second modification of the VTR shown in FIG. 1;

FIG. 18C is a graph showing a third patten PC of a relationship between a distance between an upper end of a video track and a scanning trace of a magnetic end, and an elapsed time from a start end of the video track, in a third modification of the VTR shown in FIG. 1; and FIG. 18D is a graph showing a fourth patten PC of a relationship between a distance between an upper end of a video track and a scanning trace of a magnetic end, and an elapsed time from a start end of the video track, in a fourth modification of the VTR shown in FIG. 1.

DETAILED DESCRIPTION OF THE PREFERRED EMBODIMENTS

The preferred embodiments according to the present invention will be described below with reference to the attached drawings.

FIRST PREFERRED EMBODIMENT

Figure 1:
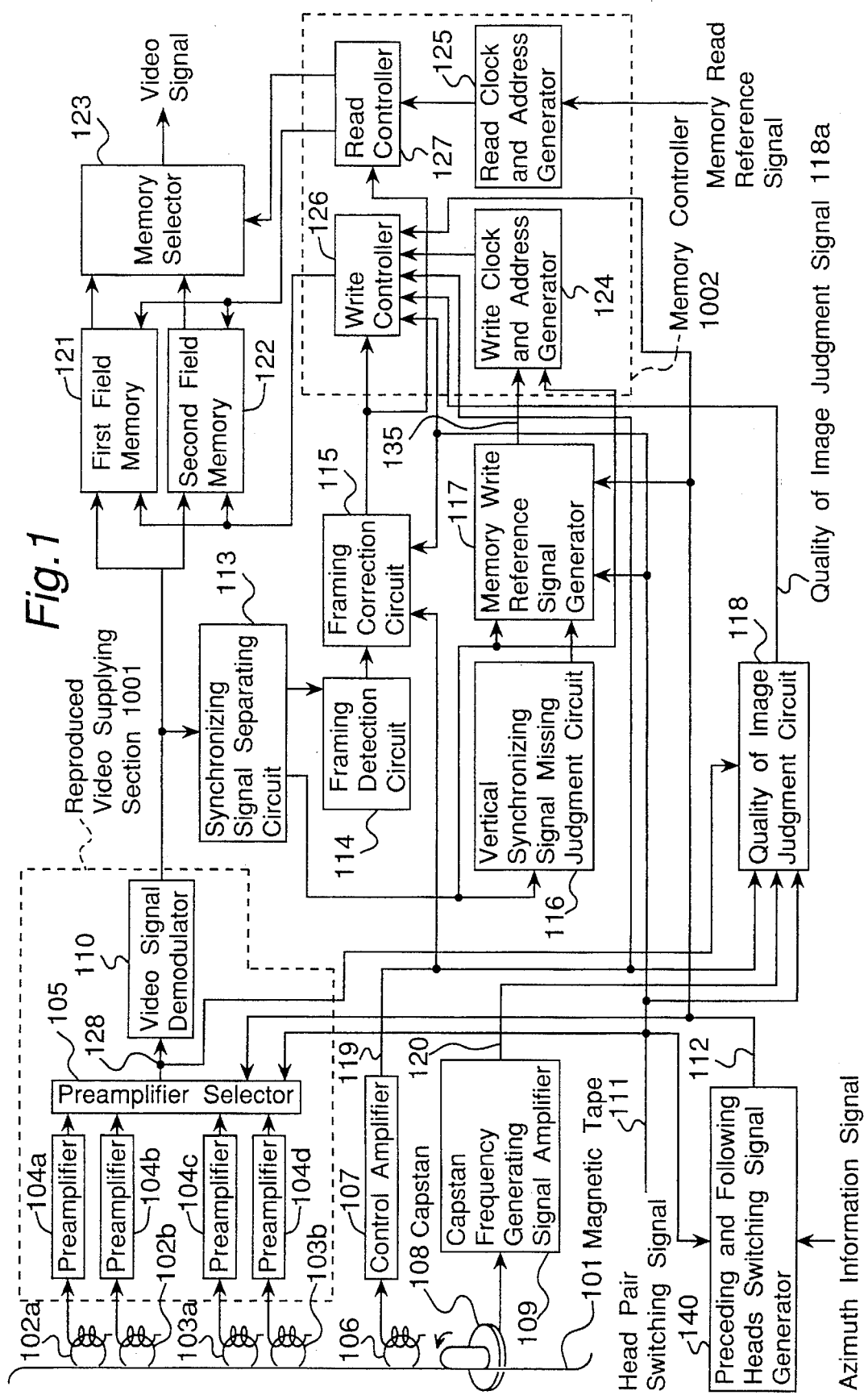
FIG. 1 is a schematic block diagram showing a construction of a helical scan type VTR in accordance with a first preferred embodiment of the present invention.

FIG. 1 shows a construction of a reproducing system of a helical scan type VTR in accordance with a first preferred embodiment of the present invention.

In FIG. 1, a reference numeral 101 denotes a magnetic tape, and the reproducing system of the VTR of the present preferred embodiment comprises:

(a) magnetic heads 102a, 102b, 103a and 103b or reproducing RF video signals, respectively;

(b) preamplifiers 104a, 104b, 104c and 104d for amplifying reproduced RF video signals generated from the magnetic heads 102a, 102b, 103a and 103b, respectively;

(c) a preamplifier selector 105 for selectively outputting either one of the four reproduced RF video signals outputted from the preamplifiers 104a through 104d;

(d) a control magnetic head 106 for generating a control signal for tracking control, which is recorded on the magnetic tape 101;

(e) a control amplifier 107 for amplifying the control signal for tracking control and outputting the amplified control signal 119;

(f) a capstan 108 for feeding or moving the magnetic tape 101 mounted together with a signal generator for generating a capstan frequency generating signal (referred to as a CAP-FG signal hereinafter) in synchronous with rotation of the capstan 108 in a manner known to those skilled in the art;

(g) a capstan frequency generating signal amplifier 109 for amplifying the CAP-FG signal generated by the signal generator, and outputting the amplified CAP-FG signal 120;

(h) a video signal demodulator 110 for frequency-demodulating the reproduced RF video signal outputted from the preamplifier selector 105 so as to obtain a reproduced video signal; and (i) a preceding and following heads switching signal generator 140 for generating a preceding and following heads switching signal representing which one of the preceding magnetic head and the following magnetic head is to be selectively switched, in a manner known to those skilled in the art, based on a head pair switching signal 111 and an azimuth information signal.

As shown in FIG. 1, a reproduced video supplying section 1001 is constituted by the preamplifiers 104a through 104d, the preamplifier selector 105, and the video signal demodulator 110.

The reproducing system of the VTR of the present preferred embodiment further comprises:

(j) a synchronizing signal separating circuit 113 for separating a vertical synchronizing signal and a horizontal synchronizing signal from the reproduced video signal outputted from the video signal demodulator 110;

(k) a framing detection circuit 114 for detecting the reproduced video signal is of the first or second field based on the synchronizing signals outputted from the synchronizing signal separating circuit 113, and outputting a framing detection signal representing the detection results;

(l) a framing correction circuit 115 for correcting the framing detection signal based on the head pair switching signal 111 and the control signal 119 and outputting the corrected framing detection signal;

(m) a vertical synchronizing signal missing judgment circuit 116 for judging whether or not the vertical synchronizing signal is missing in the synchronizing signals outputted from the synchronizing signal separating circuit 113, and outputting a signal representing the judgment results thereof;

(n) a memory write reference signal generator 117 for generating a memory write reference signal corresponding to the vertical synchronizing signal without any missing signal in stead of the vertical synchronizing signal, and outputting the memory write reference signal 135;

(o) a quality of image judgment circuit 118 for judging whether or not the reproduced RF video signal has a quality higher than a threshold quality value based on the reproduced RF video signal, the control signal 119, the CAP-FG signal 120, and the head pair switching signal 111, and outputting a quality of image judgment signal 118a representing a part of the reproduced RF video signal having the higher quality of image;

(p) field memories 121 and 122 each for storing a reproduced video signal of one field outputted from the video signal demodulator 110;

(q) a memory selector 123 for selectively outputting as a reproduced video signal either one of the reproduced video signals respectively outputted from the first and second field memories 121 and 122, based on a selection control signal outputted from the read controller 127;

(r) a write clock and address generator 124 for generating a write clock and a write address based on the memory write reference signal 135 outputted from the memory write reference signal generator 117, and the vertical synchronizing signal outputted from the synchronizing signal separating circuit 113;

(s) a read clock and address generator 125 for generating a read clock and a read address based on a memory read reference signal, wherein the memory read reference signal is generated based on the azimuth information signal and the CAP-FG signal;

(t) a write controller 126 for controlling the write operation of the first and second field memories 121 and 122 based on the corrected framing detection signal, the preceding and following heads switching signal 112, the write clock, the write address, the control signal 119 for tracking control, the quality of image judgment signal 118a, and the head pair switching signal 111; and (u) a read controller 127 for controlling the read operation of the first and second field memories 121 and 122 based on the read clock, the read address, and the corrected framing detection signal.

In FIG. 1, a memory controller 1002 is constituted by the write controller 126, the read controller 127, the write clock and address generator 124 and the read clock and address generator 125.

In the VTR shown in FIG. 1, a RF (Radio Frequency) video signal recorded on the magnetic tape 101 is reproduced by the magnetic heads 102a, 102b, 103a and 103b. The RF video signals reproduced by the magnetic heads 102a, 102b, 103a and 103b are amplified respectively by the preamplifiers 104a, 104b, 104c and 104d.

Figure 2:
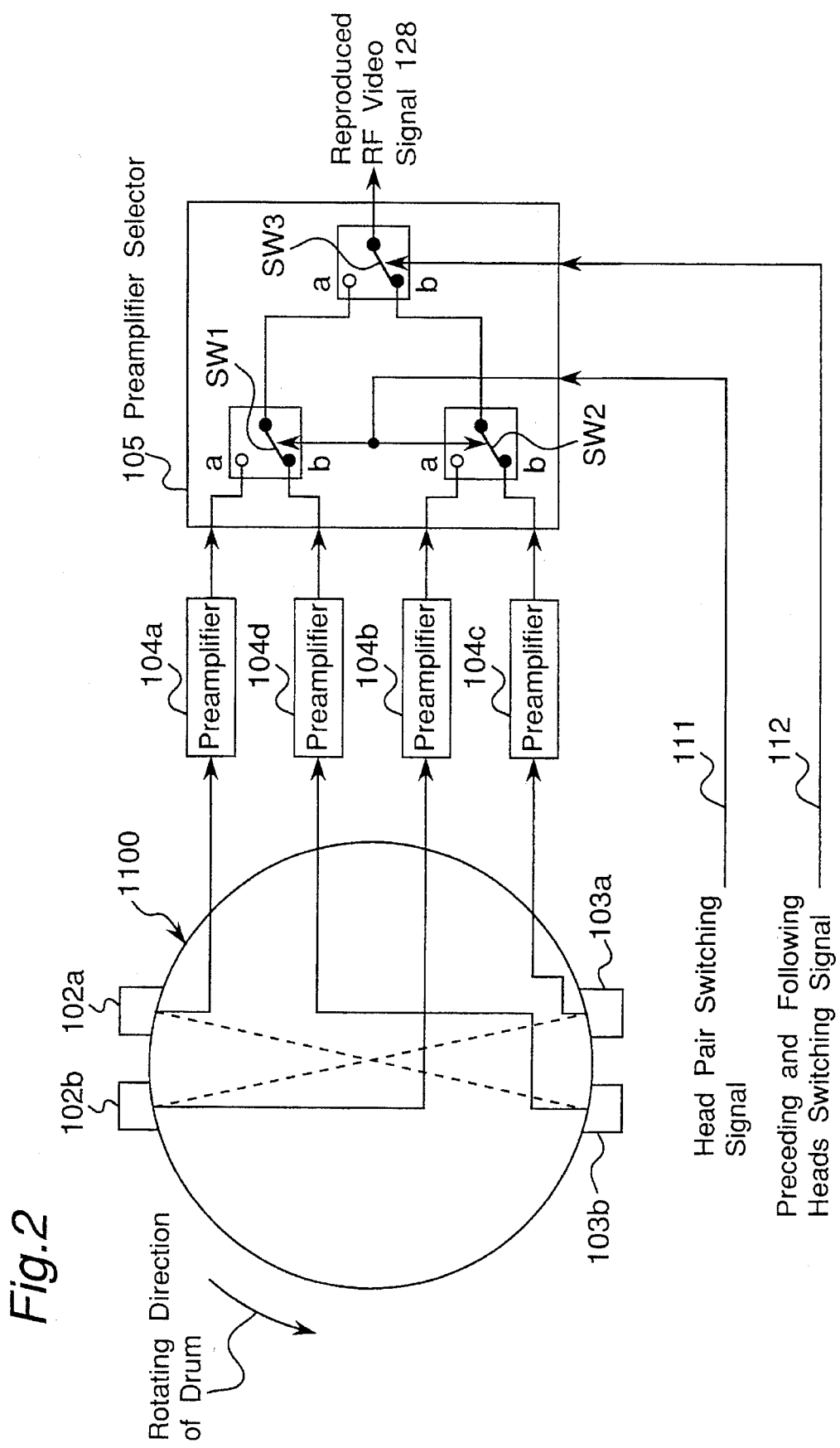
FIG. 2 is a schematic block diagram showing constructions of magnetic heads 102a, 102b, 103a and 103b, preamplifiers 104a through 104d and a preamplifier selector 105 shown in FIG. 1.

FIG. 2 shows the positions of the magnetic heads 102a, 102b, 103a and 103b arranged on the rotating drum 1100.

Referring to FIG. 2, the magnetic heads 102a, 102b, 103a and 103b are mounted on the rotation drum 1100 as follows. At a position slightly preceding in rotation of the drum 1100 from the magnetic head 102a having a first azimuth angle, the magnetic head 102b having a second azimuth angle different from the first azimuth angle is positioned. Further, at a position opposing to the magnetic head 102b and rotated at an angle of 180 degrees from the magnetic head 102b, the magnetic head 103a having the first azimuth angle is positioned. Furthermore, at a position opposing to the magnetic head 102a and rotated by an angle of 180 degrees from the magnetic head 102a, the magnetic head 103b having the second azimuth angle is positioned. It is to be noted that the magnetic head 103a is positioned at a positioned slightly preceding in rotation of the drum 1100 from the magnetic head 103b.

The preamplifier selector 105 comprises three switches SW1, SW2 and SW3. The switches SW1 and SW2 are switched over so as to be operate together based on the head pair switching signal 111. When the head pair switching signal 111 is in a high level, the switches SW1 and SW2 are switched over to respective contacts "a" thereof. On the other hand, when the head pair switching signal 111 is in a low level, the switches SW1 and SW2 are switched over to respective contacts "b" thereof. Further, the switch SW3 is switched over based on the preceding and following heads switching signal 112. When the preceding and following heads switching signal 112 is in a high level, the switch SW3 is switched over to a contact "a" thereof. On the other hand, when the preceding and following heads switching signal 112 is in a low level, the switch SW3 is switched over to a contact "b" thereof.

The reproduced RF video signal generated by the magnetic head 102a is outputted through the preamplifier 104a, the contact "a" of the switch SW1 and the contact "a" of the switch SW3. The reproduced RF video signal generated by the magnetic head 102b is outputted through the preamplifier 104b, the contact "a" of the switch SW2 and the contact "b" of the switch SW3. The reproduced RF video signal generated by the magnetic head 103a is outputted through the preamplifier 104c, the contact "b" of the switch SW2 and the contact "b" of the switch SW3. The reproduced RF video signal generated by the magnetic head 103b is outputted through the preamplifier 104d, the contact "b" of the switch SW1 and the contact "a" of the switch SW3.

Based on a combination of the azimuth information signal representing the azimuth of the video track to be scanned, and the head pair switching signal 111 for selectively switching over to either a pair of first heads including the magnetic heads 102a and 102b, or a pair of second heads including the magnetic heads 103a and 103b, the preceding and following heads switching signal generator 140 generates the preceding and following switching signal 112 for selectively switching over to either a pair of preceding heads including the magnetic heads 102b and 103a, or a pair of following heads including the magnetic heads 102a and 103b. Therefore, the preamplifier selector 105 selects and outputs either one of the four reproduced RF video signals so that the magnetic head having the same azimuth angle as that of the video track which is being scanned among the four magnetic heads 102a, 102b, 103a and 103b can always reproduce the RF video signal recorded on the video track.

Figure 3A:
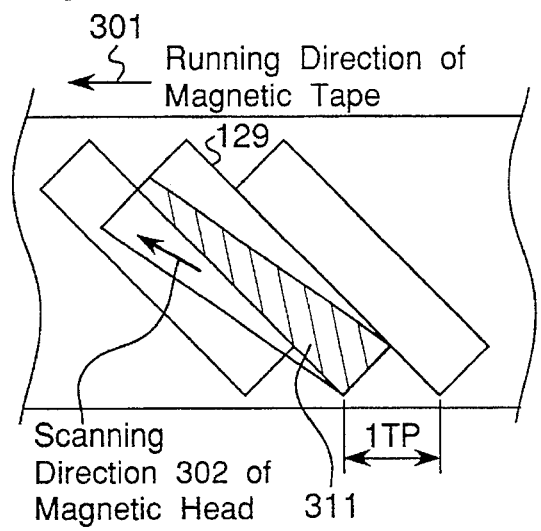
FIGS. 3A, 3B, 3C and 3D are front views respectively showing relationships, each relationship between a video track 129 and a scanning trace of a magnetic head in a ¼-time speed reproduction performed in the VTR shown in FIG. 1.
Figure 3B:
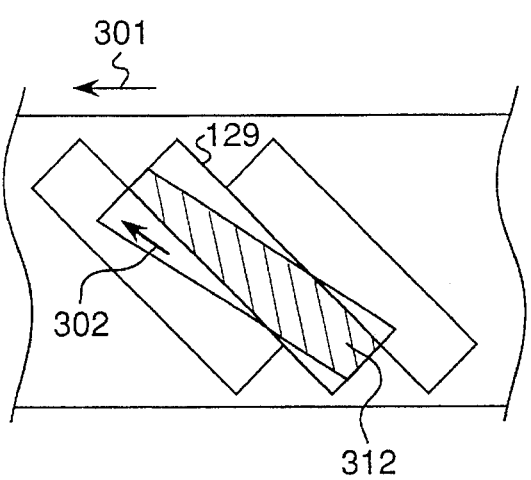
Figure 3C:
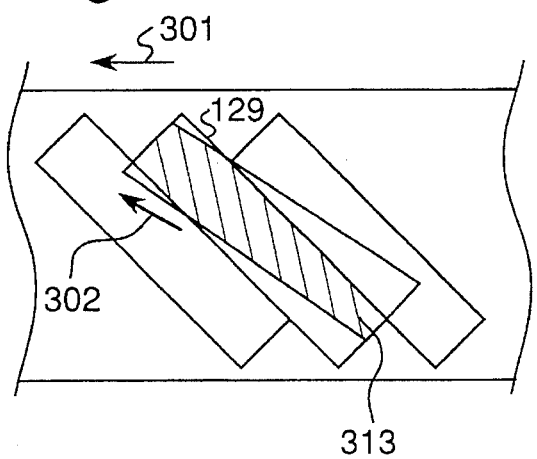
Figure 3D:
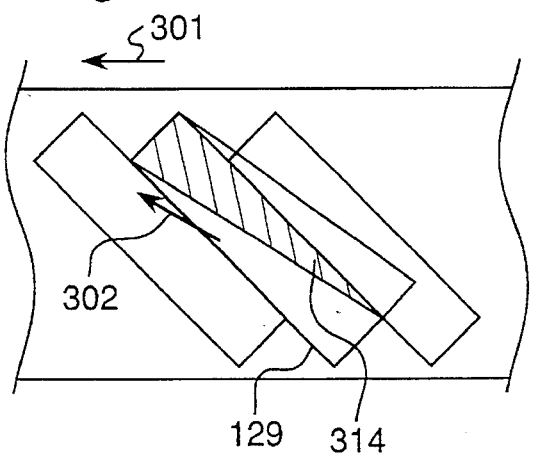
Figure 3E:
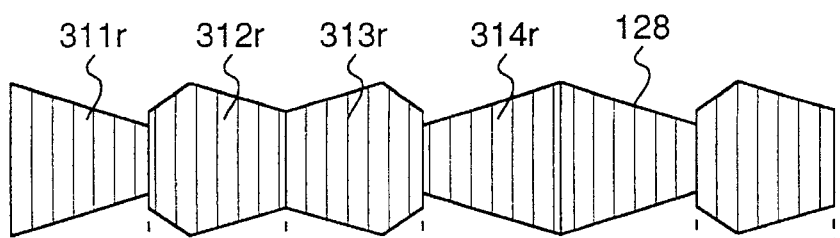
FIGS. 3E and 3F are timing charts showing a relationship between a reproduced RF (Radio Frequency) signal 128 and a head pair switching signal 111 in the ¼ -time speed reproduction shown in FIGS. 3A through 3D.
Figure 3F:
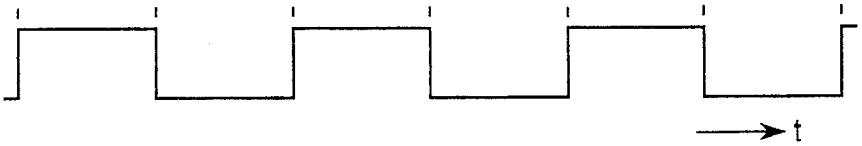

FIGS. 3A, 3B, 3C and 3D respectively show an example of relationships, each relationship between a video track 129 and a scanning trace of a magnetic head in a ¼-time speed reproduction in the forward direction performed in the VTR shown in FIG. 1, and FIGS. 3E and 3F are timing charts showing a relationship between the reproduced RF signal 128 and the head pair switching signal 111 in the ¼-time speed reproduction shown in FIGS. 3A through 3D.

Please note that the ¼-time speed reproduction means that a video signal is reproduced moving the magnetic tape at a running tape speed which is ¼ times the running speed of the normal reproduction.

In FIGS. 3A through 3D, the reference numeral 129 denotes a video track recorded on the magnetic tape at the first azimuth angle, and each of the hatched areas 311 through 314 therein represents a part of the video track to be reproduced (referred to as a reproduced part 311, 312, 313 or 314 hereinafter) when the magnetic tape is scanned by the magnetic head having the first azimuth angle. In this case, one video track 129 is scanned four times, wherein each scan of the magnetic heads corresponds to half the rotation of the drum 1100. Each of FIGS. 3A through 3D shows a relationship between the video track 129 and the scanning trace of the magnetic head having the first azimuth angle, every time the rotating drum is rotated by a half turn, while FIG. 3E shows the resulting RF video signal including parts 311r through 314r, which respectively correspond to the reproduced parts 311 through 314 and are obtained respectively in the above-mentioned cases shown in FIGS. 3A through 3D.

The reproduced RF video signal obtained thus by the selecting operation of the preamplifier selector 105 is frequency-demodulated so as to obtain a reproduced video signal by the video signal demodulator 110, and then the reproduced video signal is outputted to the first and second field memories 121 and 122 and the synchronizing signal separating circuit 113. The synchronizing signal separating circuit 113 separates the vertical and horizontal synchronizing signals from the demodulated reproduced video signal outputted from the video signal demodulator 110, and then outputs the separated vertical and horizontal synchronizing signals to the framing detection circuit 114, the vertical synchronizing signal missing judgment circuit 116, the memory write reference signal generator 117 and the write clock and address generator 124. Further, a write clock and a write address for the memories 121 and 122 are generated by the write clock and address generator 124 based on the vertical and horizontal synchronizing signals utilized as a reference signal.

Furthermore, based on the vertical and horizontal synchronizing signals outputted from the synchronizing signal separating circuit 113, the framing detection circuit 114 judges whether the reproduced video signal is of the first field or of the second field, and then outputs the framing detection signal representing the judgment result thereof to the framing correction circuit 115. When the framing detection signal outputted from the framing detection circuit 114 is changed due to noise although the framing detection signal is not originally changed when reproducing the same video track, the framing correction circuit 115 fixes the level of the framing detection signal until the video track currently being reproduced is changed. Then, when no change of state thereof occurs regardless of the fact that the video track currently being reproduced has been changed, the framing correction circuit 115 switches the framing detection signal to the other level opposite from the previous level. It is to be noted that, which video track is currently being reproduced is judged based on the head pair switching signal 111 and the control signal 119 supplied to the framing correction circuit 115.

The write controller 126 determines which of the first and second field memories 121 and 122, the video signal currently being reproduced is to be written into based on the phase difference or the time difference between the control signal 119 and the head pair switching signal 111, the quality of image judgment signal 118a outputted from the quality of image judgment circuit 118, and the framing detection signal outputted from the framing correction circuit 115. The write controller 126 also controls the memory selector 123 so as to select which of the first and second field memories 121 and 122, the reproduced video signal is to be outputted from. Further, the read clock and address generator 125 generates a read clock and a read address for reading the reproduced signal from the respective first and second field memories 121 and 122, in synchronous with the memory read reference signal inputted to the read clock and address generator 125.

Figure 4:
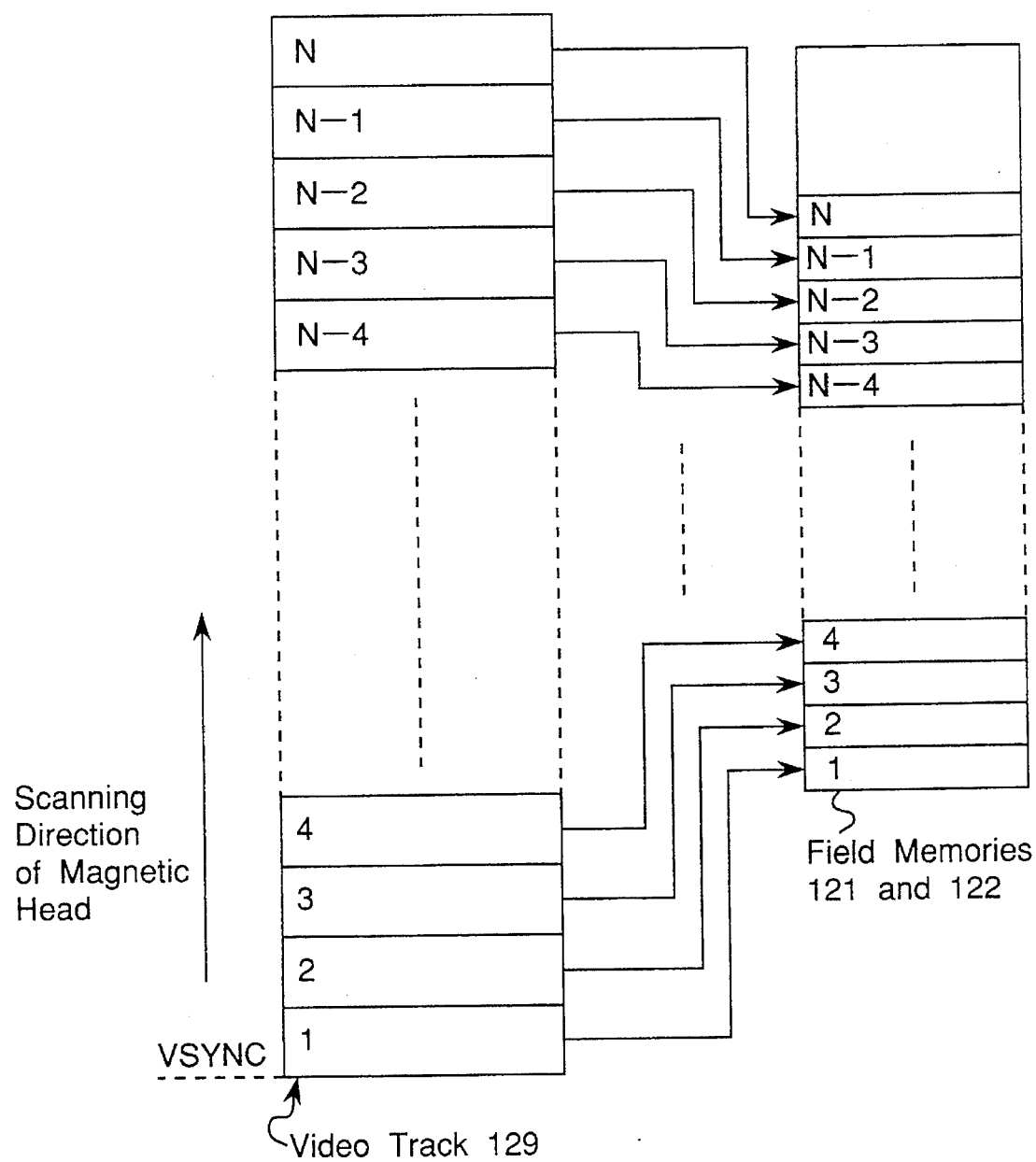
FIG. 4 is a schematic block diagram showing a relationship among part positions of a video track and memory addresses of each of field memories 121 and 122 shown in FIG. 1.

In the VTR of the present preferred embodiment shown in FIG. 1, a video signal of one field is recorded on the video track 129, and the first and second field memories 121 and 122 have such a construction that the video signal is written into addresses of the first and second field memories 121 and 122 corresponding to the positions of video tracks 129 as shown in FIG. 4.

By feeding or moving the magnetic tape in a forward or reverse direction in the longitudinal direction thereof at a speed slower than half the speed of the normal reproduction, the same video track can be reproduced at least two times. Parts each having a higher quality of image of the video signal reproduced in the above-mentioned operation is determined by the process of judging whether the reproduced RF video signal 129 has a level greater than a predetermined threshold level in the quality of image judgment circuit 118 as shown in FIG. 5A.

Figure 5A:
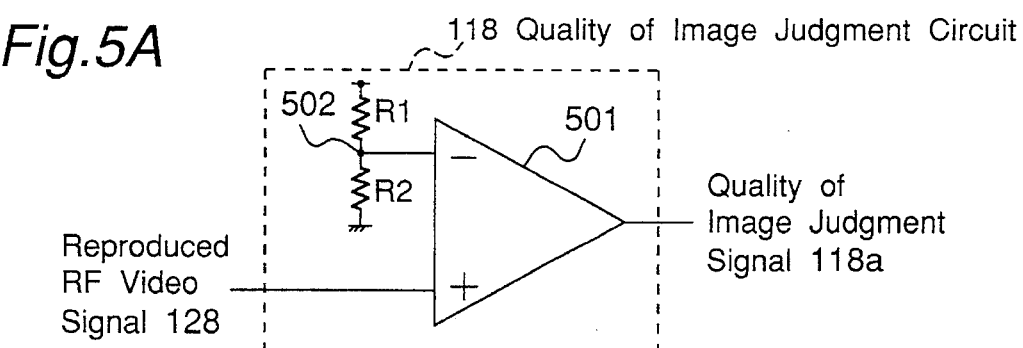
FIG. 5A is a schematic block diagram showing a construction of a quality of image judgment circuit 118 shown in FIG. 1.

Referring to FIG. 5A, the quality of image judgment circuit 118 comprises a comparator 501, and two resisters R1 and R2. A predetermined direct-current voltage is applied across the two resisters R1 and R2 connected in series, and then a predetermined reference voltage which is determined by the resistance ratio of the resisters R1 and R2 and generated at the connection point of the two resisters R1 and R2 is applied to an inverted input terminal of the comparator 501. On the other hand, the reproduced RF video signal 128 outputted from the preamplifier selector 105 is inputted to a non-inverted input terminal of the comparator 501. When the reproduced RF video signal is equal to or larger than the above-mentioned reference voltage, the quality of image judgment circuit 118 judges that the reproduced RF video signal has a quality of image equal to or higher than a predetermined threshold quality level, and then the comparator 501 generates and outputs the quality of image judgment signal 118a having a high level. On the other hand, when the reproduced RF video signal is smaller than the above-mentioned reference voltage, the quality of image judgment circuit 118 judges that the reproduced RF video signal has a quality of image lower than the predetermined threshold quality level, and then the comparator 501 generates and outputs the quality of image judgment signal 118a having a low level.

Figure 5B:
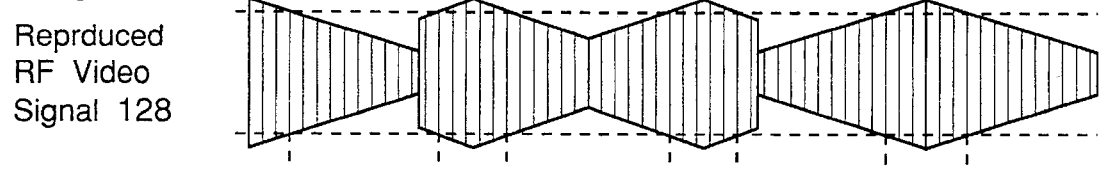
FIGS. 5B, 5C and 5D are timing charts showing a relationship among a reproduced RF signal 128, a head pair switching signal 111, and a quality of image judgment signal 118a outputted from the quality of image judgment circuit 118 shown in FIG. 5A.
Figure 5C:
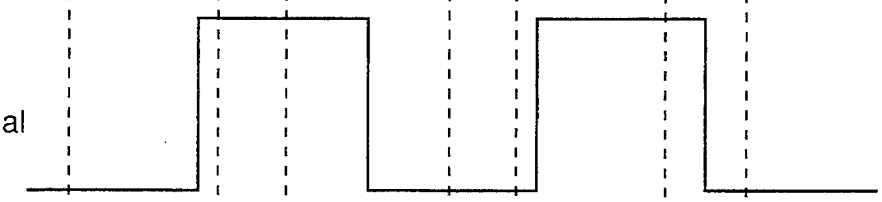
Figure 5D:
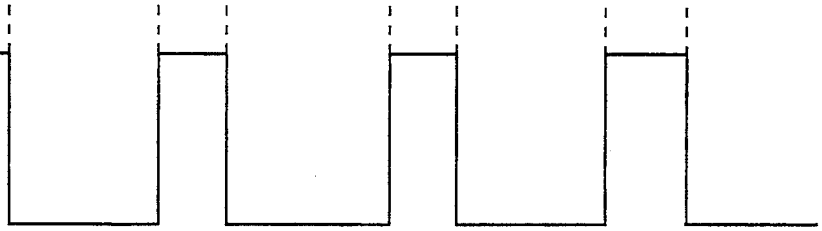

According to the judgment result of the quality of image as shown in the timing charts shown in FIGS. 5B through 5D, the RF video signal in the parts determined to have a higher quality of image is written into the addresses of the field memory 121 or 122 designated under the control of the write clock and the write address generator 124 by the operation of the write controller 126. In other words, the parts of the RF video signal each having a quality of image higher than the predetermined threshold quality level are written into the field memory 121 or 122.

Other than the above-mentioned method of judging the quality of image based on the level of the reproduced RF video signal, the following method may be utilized.

There is a further judgment method of determining a part having a smaller shift amount or deviation between the video track 129 and the scanning trace of any one of the magnetic heads based on the head pair switching signal 111, the control signal 119, and the CAP-FG signal 120, and then utilizing the determination result for the judgment of the quality of image. In the further judgment method, the quality of image judgment circuit 118 calculates the shift amount or the deviation between the video track 129 and the scanning trace of the magnetic head from the head pair switching signal 111, the control signal 119, and the CAP-FG signal 120.

Figure 6A:
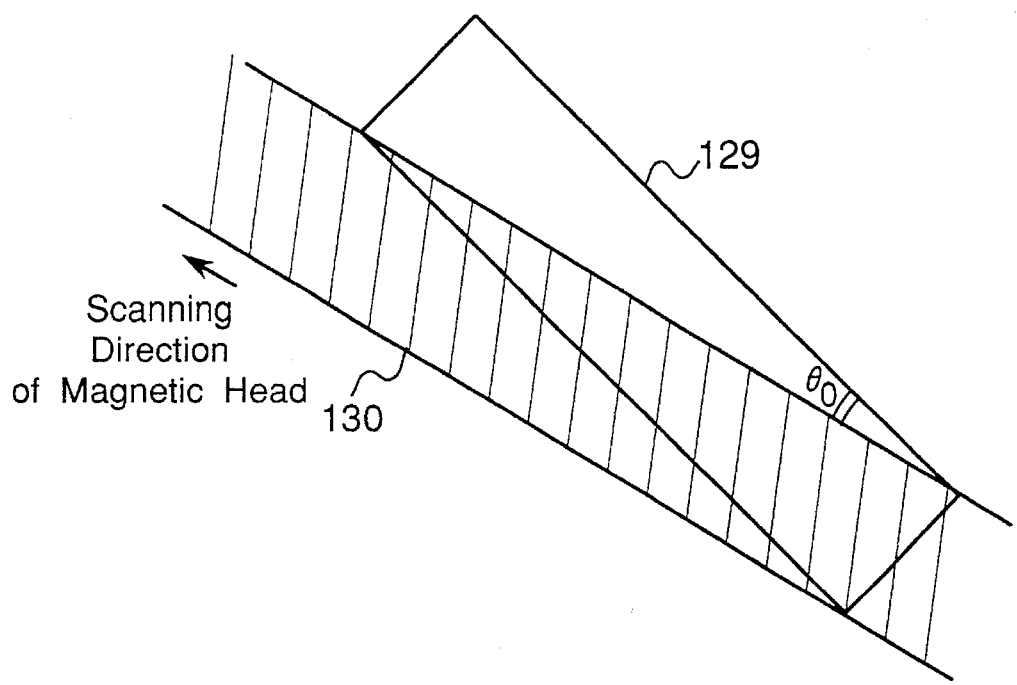
FIG. 6A is a front view showing a relationship between a video track 129 and a scanning trace 130 of a magnetic head in a still reproduction of the VTR shown in FIG. 1.

In the further judgment method, first of all, there is calculated an angle between the video track 129 and the scanning trace of the magnetic head from the head pair switching signal 111 and the CAP-FG signal 120. When the magnetic tape is stopped or in a "still reproduction", an angle $\theta_0$ between the video track 129 and the scanning trace 130 of the magnetic head is a constant in the same recording format as shown in FIG. 6A, although the angle $\theta_0$ differs depending on the recording format of each VTR system.

Figure 6B:
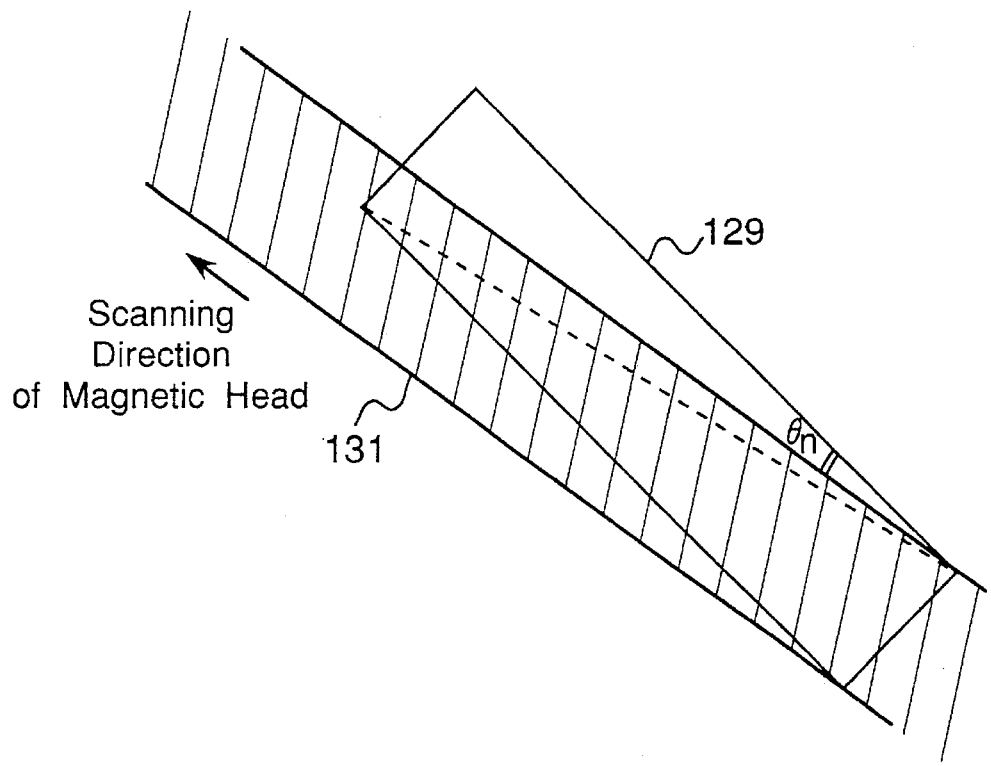
FIG. 6B is a front view showing a relationship between a video track 129 and a scanning trace 131 of a magnetic head in a 1/n-time speed reproduction of the VTR shown in FIG. 1.

On the other hand, in a 1/n-time speed slow-motion reproduction as shown in FIG. 6B, an angle $\theta_n$ between the video track 129 and a scanning trace 131 of the magnetic head satisfies the following relationship since one video track is scanned "n" times:

$$\theta_0 - \theta_n = \theta_0/n \therefore \theta_n = \{(n-1)/n\} \cdot \theta_0 \quad (1)$$

Therefore, how much times of speed the magnetic tape is running at can be found from the count of the CAP-FG signal 120 inputted for one cycle or one period of the head pair switching signal 111, and then there can be calculated the angle $\theta_n$ between the video track 129 and the scanning trace 131 of the magnetic head.

Next, a distance between the upper end of the video track 129 and the upper end of the scanning trace of the magnetic head will be calculated from the head pair switching signal 111 and the control signal 119, as follows.

Figure 7A:
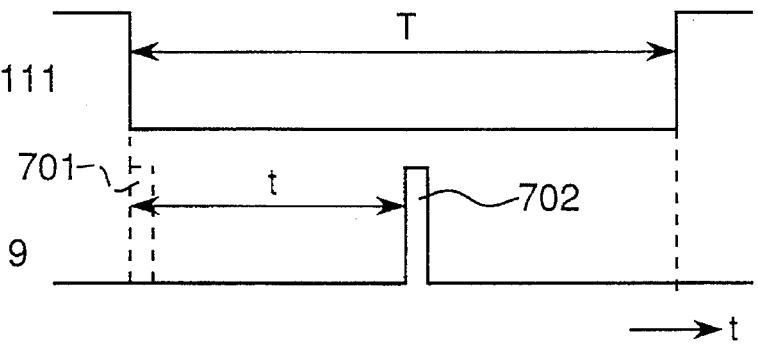
FIGS. 7A and 7B are timing charts showing a relationship between a head pair switching signal t11 and a control signal 119 for tracking control in the VTR shown in FIG. 1.
Figure 7B:
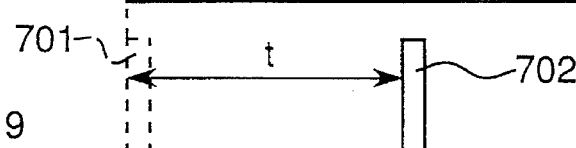
Figure 7C:
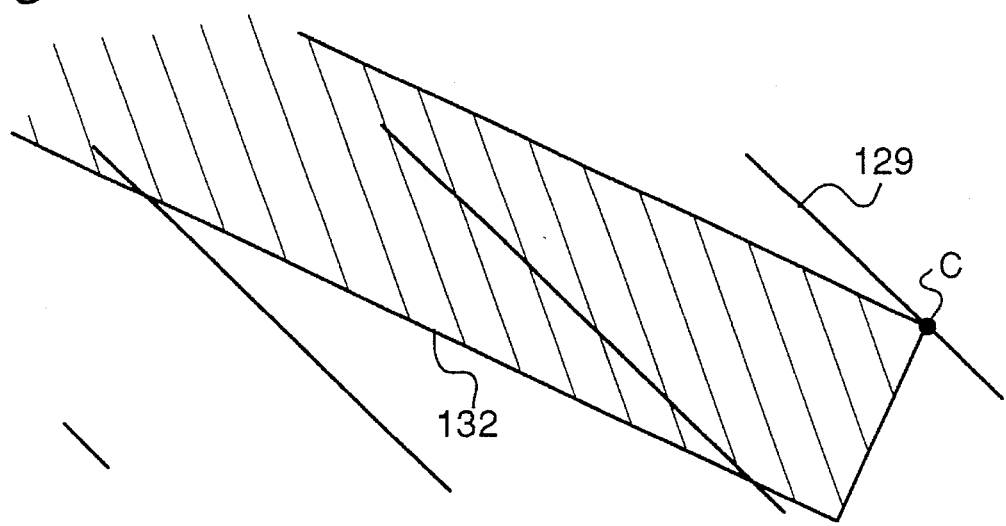
FIGS. 7C and 7D are front views each showing a relationship between an upper end of a video track and an upper end of a scanning trace of a magnetic trace in the VTR shown in FIG. 1.
Figure 7D:
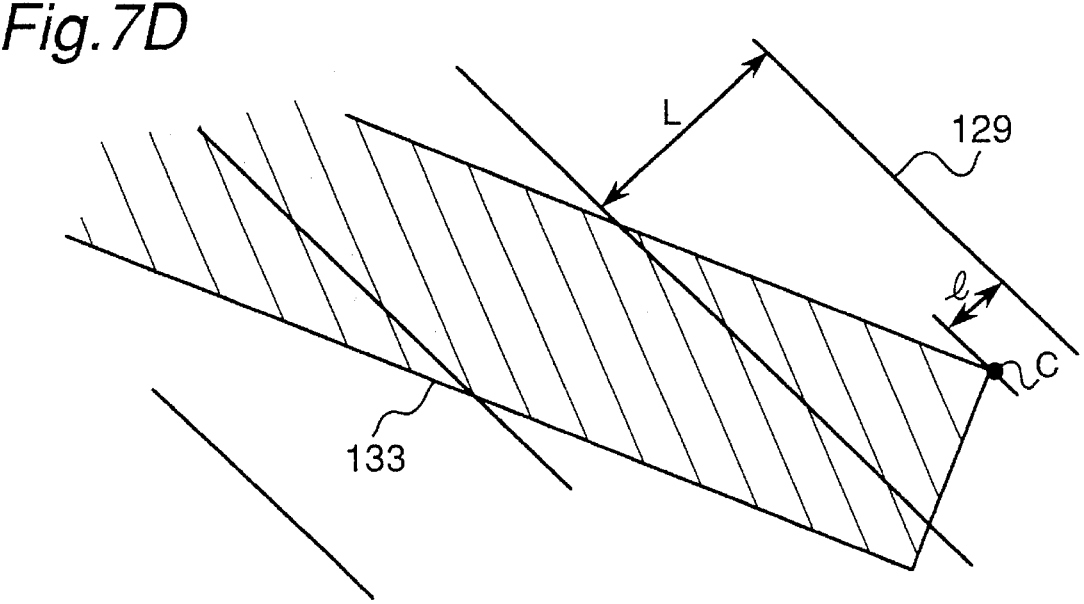

It is assumed that the video track 129 and a scanning trace 132 of the magnetic head intersects each other at a point "C" as shown in FIG. 7C, when half the cycle or period of the head pair switching signal 111 is assumed to be "T" and the control signal 119 is at a timing 701 as shown in FIGS. 7A and 7B. Further, when the control signal 119 is at a timing 702, the video track 129 and a scanning trace 133 of the magnetic head have a positional relationship therebetween as shown in FIG. 711. In this case, it is assumed that a time difference between the timings 701 and 702 of the control signal is "t", a distance between the upper end of the video track 129 and the point "C" of the scanning trace 133 of the magnetic head is 1, and the width of the video track 129 is "L". The distance 1 between the upper end of the video track 129 and the point "C" of the scanning trace 133 of the magnetic head satisfies the following relationship:

$$T:t = L:l \therefore l = (t/T) \cdot L \quad (2)$$

since the point "C" of the scanning trace 133 of the magnetic head intersects the upper end of the adjacent video track when the time difference between the timings 701 and 702 of the control signal 119 is equal to the time interval "T"

Therefore, the distance 1 between the upper end of the video track 129 and the point "C" of the scanning trace 133 of the magnetic head can be calculated from the phase difference between the head pair switching signal 111 and the control signal 119.

By thus calculating not only the angle $\theta_n$ between the video track 129 and the scanning trace of the magnetic head but also the distance 1 between the upper end of the video track 129 and the upper end of the scanning trace of the magnetic head, the quality of image judgment circuit 118 estimates how much degree of shift amount or deviation between the video track and the magnetic head, and then judges that the part having a smaller shift amount or deviation has a higher quality of image, further supplies the quality of image judgment signal 118a representing the judgment result of higher the quality of image to the write controller 126.

The above estimation method will be described in detail as follows. As shown in FIG. 17A, it is assumed that:

(a) the width of the video track 129 is "L";

(b) the longitudinal length of the video track 129 is "$T_1$";

(c) half the cycle or period of the head pair switching signal 111 is "T";

(d) a distance between the upper end of the video track 129 and the scanning trace of the magnetic head at the start end of video track 129 when the magnetic tape is moved at the 1/n-time speed;

(e) a distance between the start end of the video track 128 and a point "D" on an edge of the video track 129 when the time "t" has been elapsed from the start end of the video track 129 is "$t_1$"; and (f) a shift amount or distance between the upper end of the video track 129 and the scanning trace of the magnetic head is l(t). In this case, the following equation is satisfied:

$$T_1:t_1 = T:t \therefore t_1 = (t/T) \cdot T_1 \quad (3),$$

and $$\tan \theta_0 = L/T_1 \therefore \theta_0 = \tan^{-1}(L/T_1) \quad (4)$$

Accordingly, as shown in FIG. 17B, the shift amount l(t) between the point "D" on the edge of the video track 129 and the scanning trace 135 of the magnetic head is represented using the above-mentioned equations (3) and (4) by the following equations:

$$\begin{aligned} l(t) &= l + t_1 \cdot \tan \theta_0 \quad (5) \\ &= l + t_1 \cdot \tan\{(n-1/n) \cdot \theta_0\} \\ &= l + (t/T) \cdot T_1 \cdot \tan\{(n-1/n) \cdot \tan^{-1}(L/T_1)\}. \end{aligned}$$

In this case, a part of the reproduced RF video signal when the shift amount $l(t) \leq L/n$, namely, the shift amount l(t) is relatively small has a higher quality of image.

Further, a further simpler method for calculating the shift amount l(t) between the video track 129 and the scanning trace of the magnetic head 135 will be described in detail below using any one of four patterns PA, PB, PC and PD respectively shown in FIGS. 18A, 18B, 18C and 18D.

In this case, it is assumed that:

(a) the count number of the CAP-FG signal 120 per one field in the normal reproduction is $N_{FG}$; and (b) the count number of the CAP-FG signal 120 inputted during a time interval when the magnetic head scans the video track once in the 1/n-time reproduction is $n_{FG}$.

The graph of FIG. 18A shows a direct proportional relationship between the distance l(t) between the upper end of the video track and the scanning trace of the magnetic head and the scanning time interval "t" when the magnetic head scans the video track from the start end thereof. In this case, there may be provided a first counter for counting the inclination L/t of the graph shown in FIG. 18A. This patten PA shows a relationship between the shift amount l(t) and the elapsed time "t" in the still reproduction.

FIG. 18B shows a pattern PB representing the distance l between the start end of the upper end of the video track and the scanning trace of the magnetic head. In this case, there may be provided a second counter in which the distance l is set.

FIG. 18C shows a pattern PC having a relationship wherein the count is decremented by a value $L/N_{FG}$ every time the CAP-FG signal 120 is inputted, and then the shift amount l(t) becomes $-L \cdot (n_{FG}/N_{FG})$ at a timing when the time interval "T" has been elapsed. In this case, there may be provided a third counter which is decremented by a value $L/N_{FG}$ every time the CAP-FG signal 120 is inputted.

In the other method for calculating the above-mentioned shift amount l(t), there may be used a pattern PD shown in FIG. 18D representing a relationship between the video track and the scanning trace of the magnetic head in a simple way, wherein the pattern PD can be obtained by adding the above-mentioned patterns PA, PB and PC. In this method, there may be provided a fourth counter for counting the addition result of the counts of the first, second and third counters. In this case, a part of the reproduced RF video signal when the shift amount $l(t) \leq L/n$, namely, the shift amount l(t) is relatively small has a higher quality of image using the fourth counter.

Generally speaking, in the slow-motion reproduction, since the magnetic tape 101 is fed at a speed lower than the speed of the normal reproduction, the position of the partial image which can be determined to have a higher quality of image changes in each scanning. Therefore, by repeating the above-mentioned operation every scan from the timing when a video track is subjected to reproduction to the timing when the scan of the magnetic head shifts to the next video track, a plurality of partial images are patched up or combined into one memory so as to form an image of one field. After constituting the image of one field, the video signal having the patched image is outputted as an output image while the image of the next field is patched up in the other memory. This results in a noise-free and slow-motion reproduction.

Figure 8B:
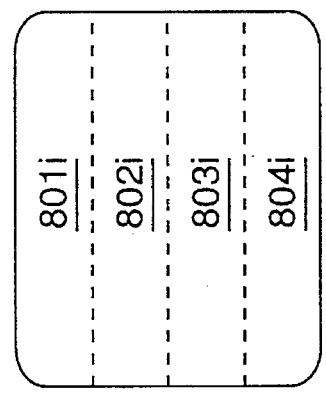
FIG. 8B is a front view of an image displayed on a display unit, which is composed of four parts 801i through 804i respectively corresponding to 801 through 804 of the reproduced RF signal 128 shown in FIG. 8A.
Figure 8A:
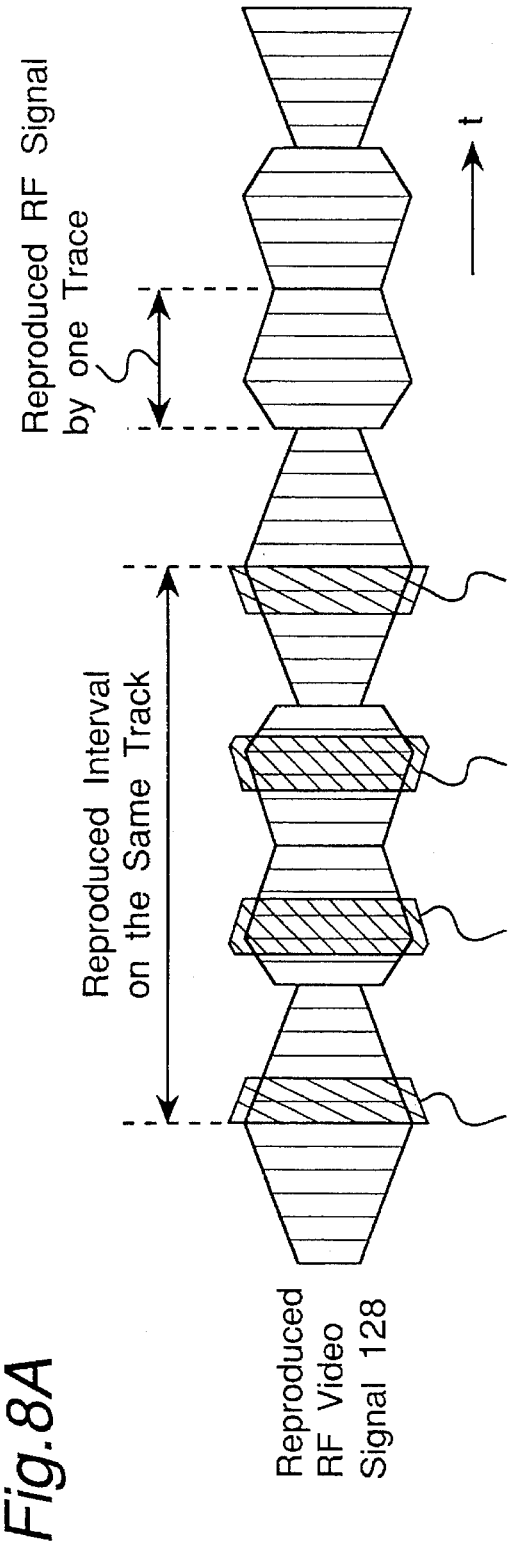
FIG. 8A is a timing chart of a reproduced RF signal 128 in a slow-motion reproduction of the VTR shown in FIG. 1.

FIGS. 8A and 8B show an exemplified reproduced signal in the ¼-time speed reproduction. As shown in FIGS. 8A and 8B, parts 801, 802, 803 and 804 of the reproduced RF video signal 128 having a larger output level in each of the four scannings are determined to be the above-mentioned parts of the RF video signal having a higher quality of image, respectively, and then the parts 801 to 804 of the reproduced RF video signal are successively combined or patched with each other in one field memory 121 or 122, thereby constituting an image of one field which is composed of first to fourth quarter images 801i through 804i as shown in FIG. 8B.

In this example shown in FIGS. 8A and 8B, the part 801 of the reproduced RF video signal obtained in the first scan becomes the first quarter image 801i positioned in the top part of one image displayed on a display unit, the part 802 of the reproduced RF video signal obtained in the second scan becomes the second quarter image 802i positioned in the second part below the top part of one image displayed on the display unit, the part 803 of the reproduced RF video signal obtained in the third scan becomes the third quarter image 803i positioned in the third part below the above second part of one image displayed on the display unit, and the part 804 of the reproduced RF video signal obtained in the fourth scan becomes the fourth quarter image 804i positioned in the bottom part of one image displayed on the display unit.

In the VTR shown in FIG. 1, for example, when the reproduced video signal is of the first field, the video signal is written into the first field memory 121. On the other hand, when the reproduced video signal is of the second field, the video signal is written into the second field memory 122. With the above-mentioned arrangement, the field of the image can be distinguished based on only the selecting information signal representing which memory the signal is being read from.

In the VTR of the present preferred embodiment shown in FIG. 1, the reproduced video signal is written into each of the first and second field memories 121 and 122 with reference to the vertical synchronizing signal separated from the reproduced video signal by the synchronizing signal separating circuit 113. However, when the vertical synchronizing signal is missing, the missing judgment result is supplied from the vertical synchronizing signal missing judgment circuit 116 to the memory write reference signal generator 117. The memory write reference signal generator 117 supplies the memory write reference signal 135, which substitutes for the vertical synchronizing signal, to the write clock and address generator 124, thereby consistently preventing the reference of the write operation from deviating or dropping out.

FIGS. 9A through 9D show this operation of the memory write reference signal generator 117 in the above-mentioned stage.

As shown in FIGS. 9A through 9D, the preceding and following heads switching signal 112 becomes a low level when the magnetic head effective for the reproduction is the preceding head, whereas the preceding and following heads switching signal 112 becomes a high level when the head effective for the reproduction is the following head. In the case where the following head is selected when the head pair switching signal 111 becomes a high level, the vertical synchronizing signal 134 to be reproduced by the following head is reproduced at a specified timing with respect to the head pair switching signal 111, namely, at a timing a predetermined time interval $t_1$ after the leading edge of the above-mentioned head pair switching signal 111. On the other hand, the vertical synchronizing signal 134 to be reproduced by the preceding head is reproduced at a timing tm1 in advance of the vertical synchronizing signal 134 reproduced by the following head with respect to the head pair switching signal 111 by a phase difference or a time interval α corresponding to the phase difference which is determined depending on the difference in the mounted position between the preceding head and the following head.

For example, when the vertical synchronizing signal 134 can be reproduced, a phase difference t1 between the head pair switching signal 111 and the vertical synchronizing signal 134 is detected. In this case, it is assumed that the preceding and following heads switching signal 112 becomes a high level, namely, the reproduction is executed by the following head. It is further assumed that the preceding and following heads switching signal 112 becomes a low level, namely, the reproduction is executed by the preceding head in the next scan of the magnetic head. On the above-mentioned assumption, when outputting the memory write reference signal 135 at the following timing tm1:

$$T2=t1-\alpha \quad (6)$$

which is a timing time interval T2 after the head pair switching signal 111, the memory write reference signal 135 has the same timing as that of the vertical synchronizing signal 134 inputted actually.

On the other hand, when the preceding and following heads switching signal 112 becomes a low level, namely, the reproduction is executed by the preceding head, then a phase difference t2 between the head pair switching signal 111 and the vertical synchronizing signal 134 is detected. Thereafter, when the preceding and following heads switching signal 112 becomes a high level, namely, the reproduction is executed by the following head, the memory write reference signal 135 is outputted from the memory write reference signal generator 117 at a timing tm2 which is a timing the following time interval T3 after the trailing edge of the head pair switching signal 111:

$$T3=t2+\alpha \quad (7)$$

Furthermore, when the phase difference between the vertical synchronizing signal 134 and the head pair switching signal 111 is detected and also when the memory write reference signal 135 is outputted in the next scan of the magnetic head, in the case where the level of the preceding and following heads switching signal 112 does not change, namely, in the case where the preceding and following heads switching signal 112 becomes the high level for selecting the following head from the high level for selecting the following head, or in the case where the preceding and following heads switching signal 112 becomes the low level for selecting the preceding head from the low level for selecting the preceding head, the memory write reference signal 135 is outputted from the memory write reference signal generator 117 at a timing tm3 which is a time interval the following time interval T4 after the leading edge of the head pair switching signal 111:

$$T4=T3 \quad (8).$$

To express the above-mentioned relationships by general equations, it is assumed that:

(a) the phase difference between the head pair switching signal 111 and the vertical sychronizing signal 134 at the time of the n-th scanning trace when the vertical synchronizing signal 134 is lastly detected is tn; and (b) the phase difference between the head pair switching signal 111 and the memory write reference signal 135 when the vertical synchronizing signal 134 cannot be detected in the next scanning trace of the magnetic head is Tn+1. In this case, the following relationship can be obtained:

$$Tn+1=tn+k\cdot\alpha \quad (9)$$

Assuming that the output of the preceding and following heads switching signal 112 in the n-th scanning trace of the magnetic head is S2(n), the above-mentioned coefficient k is expressed as follows:

(a) $k=+1$ (10a)

when $S2(n)$ = Low (preceding head selected) and
$S2(n+1)$ = High (following head selected);

(b) $k=0$ (10b)

when $S2(n)$ = Low (preceding head selected) and
$S2(n+1)$ = Low (preceding head selected);

(c) $k=0$ (10c)

when $S2(n)$ = High (following head selected) and
$S2(n+1)$ = High (following head selected);

and (d) $k=-1$ (10d)

when $S2(n)$ = High (following head selected) and
$S2(n+1)$ = Low (preceding head selected).

A higher-precision operation of the memory write reference signal generator 117 of a further improved preferred embodiment will be described below with reference to timing charts shown in FIGS. 10A through 10C.

A phase difference t11 between the vertical synchronizing signal 134 obtained in the previous scan and the vertical synchronizing signal 134 obtained in the current scan is detected when two continuous vertical synchronizing signals 134 can be reproduced. It is assumed that the vertical synchronizing signal 134 obtained in the previous scan is reproduced by the following head when the preceding and following heads switching signal 112 becomes the high level, while the vertical synchronizing signal 134 obtained in the current scan is reproduced by the preceding head when the preceding and following heads switching signal 112 becomes the low level. Further, assuming that the phase difference between the vertical synchronizing signals 134 reproduced by the magnetic heads arranged so as to oppose to each other by 180° is t0 in this case, the following equation is satisfied:

$$t11=t0-\alpha \quad (11)$$

Assuming that the preceding and following heads switching signal 112 becomes the high level, namely, the reproduction is executed by the following head in the next scan by the magnetic head, a phase difference t12 between the vertical synchronizing signal 134 obtained in the previous scan and the vertical synchronizing signal 134 obtained in the current scan can be similarly expressed as follows:

$$t12=t0+\alpha \quad (12)$$

Therefore, assuming that the phase difference between the vertical synchronizing signal 134 in the previous scan and the memory write reference signal 135 is T12, the following equation is satisfied:

$$\begin{aligned} T12 &= t0+\alpha \\ &= (t11+\alpha)+\alpha \\ &= t11+2\cdot\alpha. \end{aligned} \quad (13)$$

To express the above-mentioned relationships by general equations, assuming that the phase difference between the vertical synchronizing signal 134 obtained in the previous scan and the vertical synchronizing signal 134 obtained in the current scan is t1n, and also the time interval from the leading edge of the memory write reference signal 135 of the previous scan to the leading edge of the memory write reference signal 135 of the current scan is T1n, the following equation can be obtained:

$$T1(n+1)=t1n+2 \cdot k \cdot \alpha \quad (14)$$

Assuming that the output signal from the preceding and following heads switching signal 112 in the n-th scanning trace by the reproduction video head is S2 (n), the coefficient k is expressed as follows:

(a) $k = +1$ (15a)
when $S2(n) =$ Low (preceding head selected) and
$S2(n + 1) =$ High (following head selected);

(b) $k = 0$ (15b)
when $S2(n) =$ Low (preceding head selected) and
$S2(n + 1) =$ Low (preceding head selected);

(c) $k = 0$ (15c)
when $S2(n) =$ High (following head selected) and
$S2(n + 1) =$ High (following head selected);

and (d) $k = -1$ (15d)
when $S2(n) =$ High (following head selected) and
$S2(n + 1) =$ Low (preceding head selected).

Since the memory read operation is executed based on the memory read reference signal, a change of the reproduced video signal on the time base can be corrected at the same time.

Further, when both of the reproduced video signal and the memory read reference signal are of the first field or the second field, or when the reproduced video signal is of the first field and the memory read reference signal is of the second field, the reproduced video signal is read out from one of the field memories 121 and 122 based on the memory read reference signal. Furthermore, when the reproduced video signal is of the second field and the memory read reference signal is of the first field, the reproduced video signal is read out from one of the field memories 121 and 122 based on the memory read reference signal, and then an image displayed on a display unit is seen so as to be shifted upward by one horizontal scanning line. Therefore, in this case, the timing of memory reading is controlled to be delayed by the read controller 127 by one horizontal scanning line corresponding to one period of the horizontal synchronizing signal, thereby correcting the shift amount of the image to be displayed on the display unit. In other words, there can be corrected the interlace relationship between the images of the first and second fields.

SECOND PREFERRED EMBODIMENT

Figure 11:
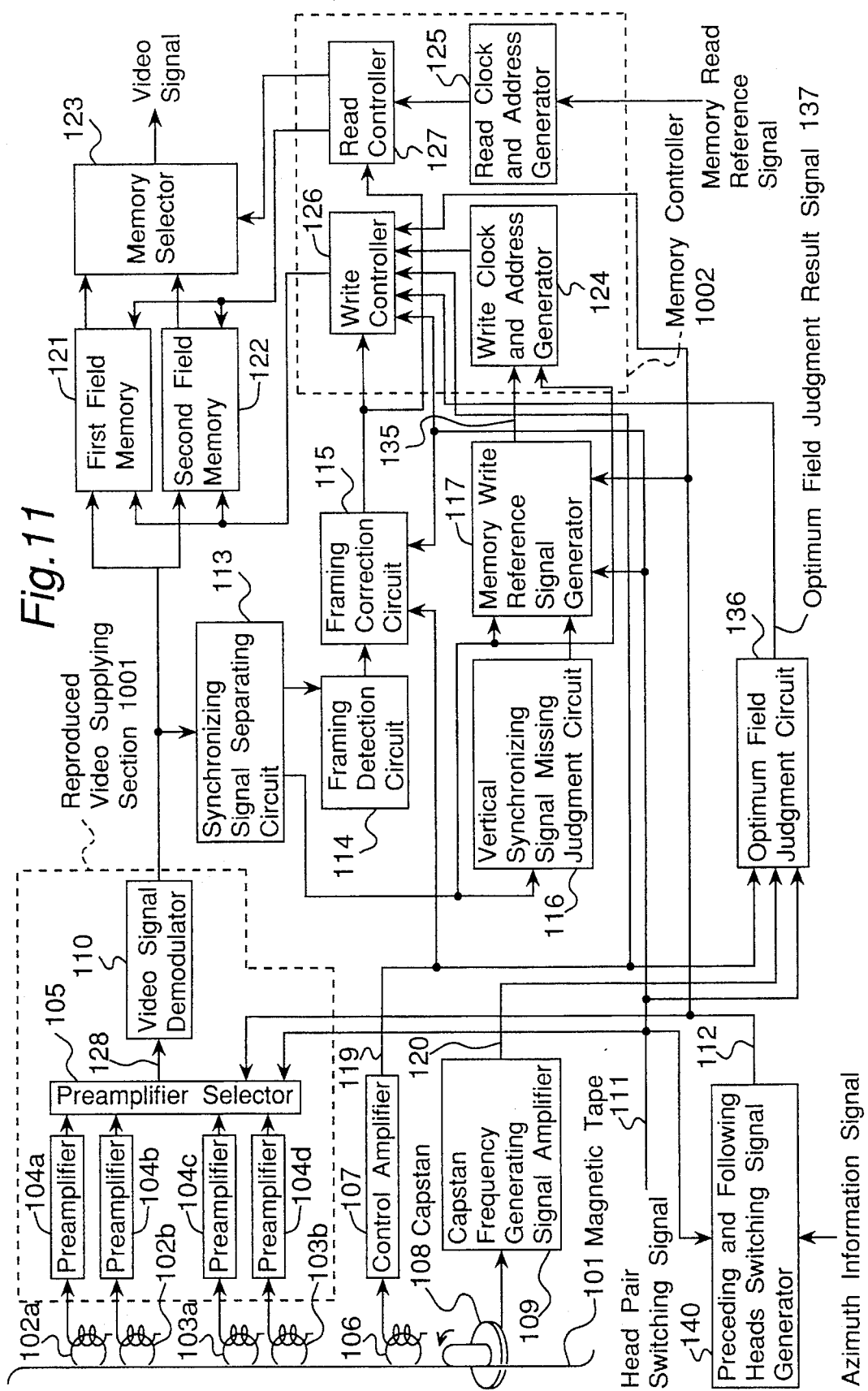
FIG. 11 is a schematic block diagram showing a construction of a helical scan type VTR in accordance with a second preferred embodiment of the present invention.

FIG. 11 shows a reproducing system of a helical scan type VTR in accordance with a second preferred embodiment of the present invention.

The differences between the VTR of the second preferred embodiment and the VTR of the first preferred embodiment are as follows:

(a) an optimum field judgment circuit 136 is provided in place of the quality of image judgment circuit 118 as shown in FIG. 1. The same components as the components shown in FIG. 1 which shows the construction of the first preferred embodiment are denoted by the same reference numerals.

In the VTR shown in FIG. 11, the optimum field judgment circuit 136 receives the control signal 119 for tracking control outputted from the control amplifier 107, the CAP-FG signal 120 outputted from the capstan frequency generating signal amplifier 109, and the head pair switching signal 111, judges a time interval for obtaining the optimum reproduced RF video signal among a plurality of times of scan of respective magnetic heads based on these inputted signals, concretely speaking, judges a time interval when the differences of the reproduced RF video signal become smaller during one field, and then supplies an optimum field judgment result signal 137 representing the judgment result of the time interval thereof to the write controller 126.

Figure 12A:
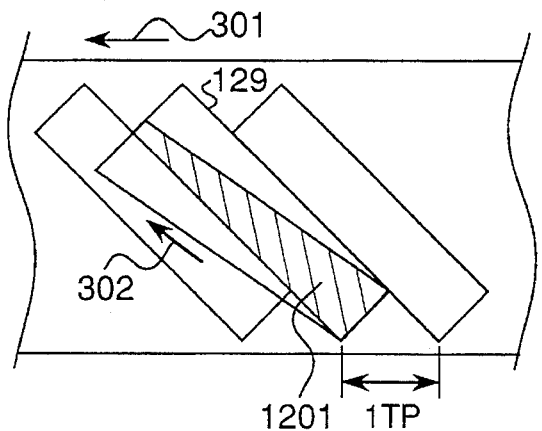
FIGS. 12A, 12B, 12C and 12D are front views each showing a relationship between a video track and a scanning trace of a magnetic head in the ¼-time speed reproduction of the VTR shown in FIG. 11.
Figure 12B:
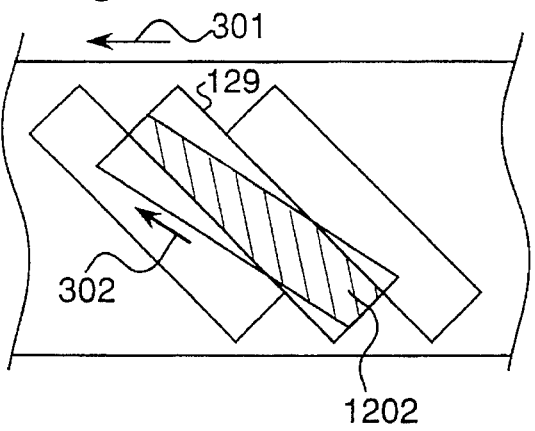
Figure 12C:
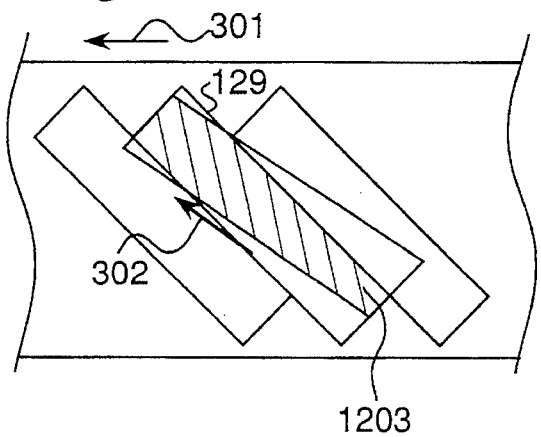
Figure 12D:
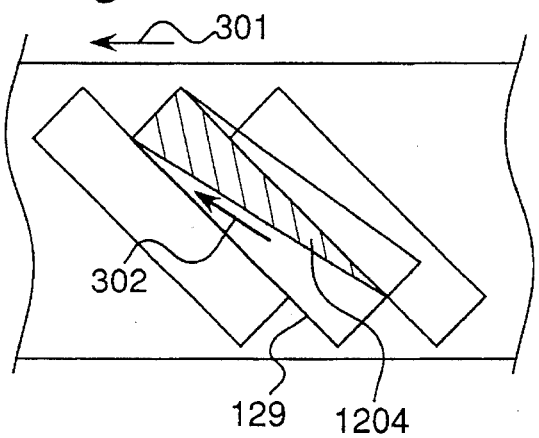
Figure 12E:
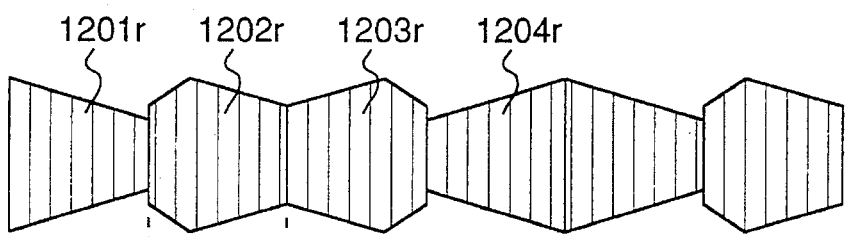
FIGS. 12E and 12F are timing charts showing a relationship between a reproduced RF signal 128 and an optimum field judgment result signal 137 in the ¼-time speed reproduction shown in FIGS. 12A through 12D.
Figure 12F:
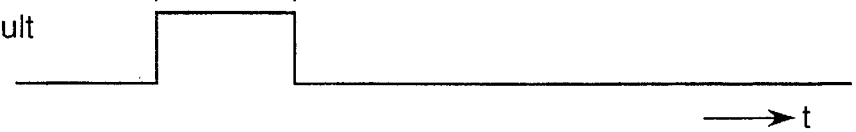
Figure 13A:
FIGS. 13A, 13B, 13C, 13D, 13E, 13F, 13G and 13H are timing charts showing a relationship among a head pair switching signal 111, a control signal 119 for tracking control, a CAP-FG (capstan frequency generating) signal 120, a preceding and following heads switching signal 112, a memory switching signal 138, a count of a CAP-FG (capstan frequency generating) counter 139, a reproduced RF signal 128, and an optimum field judgment result signal 137 in the ¼-time speed reproduction of the VTR shown in FIG. 11.
Figure 13B:
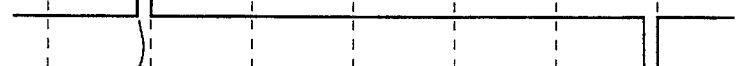
Figure 13C:
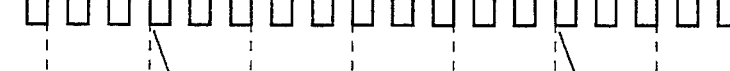
Figure 13D:
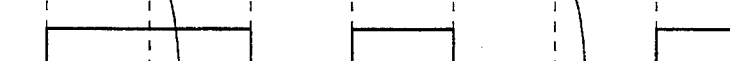
Figure 13E:
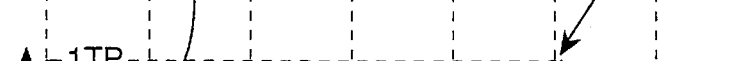
Figure 13F:
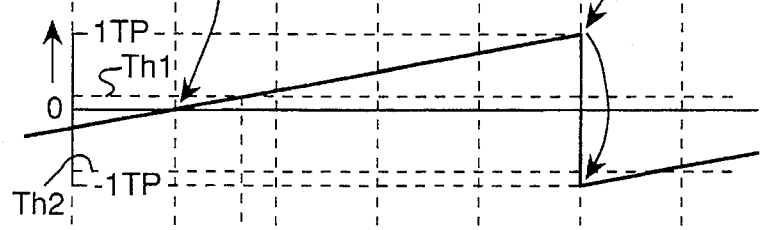
Figure 13G:
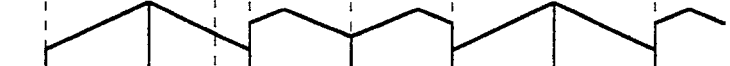
Figure 13H:
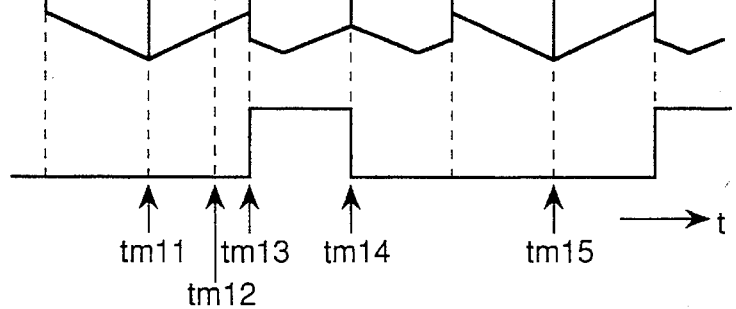
Figure 16:
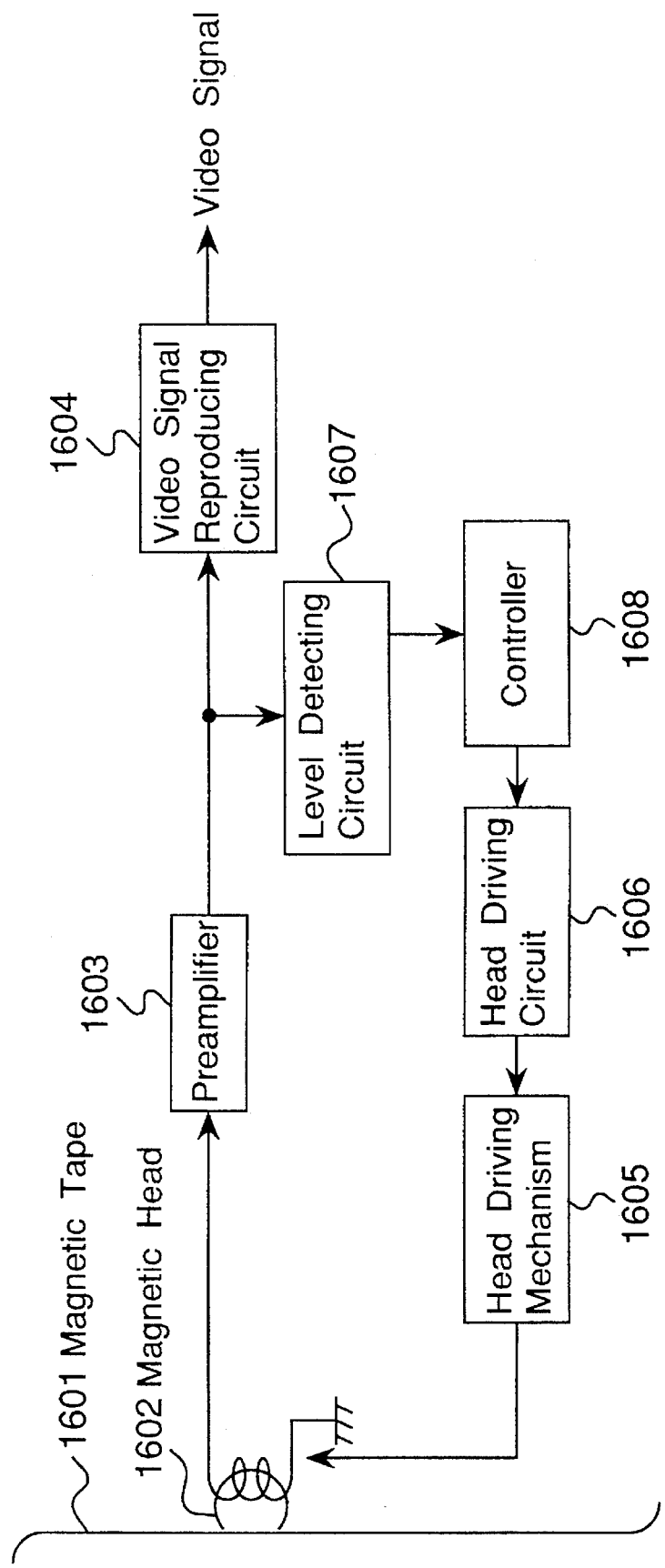
FIG. 16 is a schematic block diagram showing a construction of a conventional helical scan type VTR.

FIGS. 12A, 12B, 12C and 12D are front views each showing a relationship between a video track and a scanning trace of a magnetic head in the ¼-time speed reproduction of the VTR of the second preferred embodiment shown in FIG. 11. FIGS. 12E and 12F are timing charts showing a relationship between a reproduced RF signal 128 and the optimum field judgment result signal 137 in the ¼-time speed reproduction shown in FIGS. 12A through 12D. In this example, the scanned part 1201 of the reproduced RF video signal (hatched in FIG. 12A) corresponds to the reproduced part 1201r thereof, the scanned part 1202 of the reproduced RF video signal (hatched in FIG. 12B) corresponds to the reproduced part 1202r thereof, the scanned part 1203 of the reproduced RF video signal (hatched in FIG. 12C) corresponds to the reproduced part 1203r thereof, and the scanned part 1204 of the reproduced RF video signal (hatched in FIG. 12D) corresponds to the reproduced part 1204r thereof. In this case, the video track is scanned four times, namely, the rotation drum 1100 is rotated by total two rotations, and then the optimum field judgment circuit 136 judges a time interval corresponding to the scanned part 1202 when the differences of the reproduced RF video signal become smaller during one field, and then supplies the optimum field judgment result signal 137 representing the judgment result thereof as shown in FIG. 12F.

FIGS. 13A through 13H show timing charts of an optimum field judging operation. A CAP-FG counter 139 for counting the CAP-FG signal 120 is constructed, so that the CAP-FG counter 139 is set to "0" at a leading or trailing edge of the CAP-FG signal 120 inputted first after the control signal 119 is inputted (at a timing tm11 in the example of FIGS. 13A through 13H), and thereafter, the CAP-FG counter 139 is reset from "+1TP" to "−1TP" when the CAP-FG signal 120 corresponding to one video track pitch has been inputted. TP means the count value of the capstan frequency generating signal corresponding to one track pitch, wherein one track pitch is defined as a distance in the running direction of the magnetic tape from a bottom end of a video track to another bottom end of the next video track, as shown in FIG. 3A.

By switching the preceding and following heads switching signal 112 so that the magnetic head having the first azimuth angle is used for the reproduction when the count value of the CAP-FG counter 139 ranges from "0" to "1TP" in accordance with the timing of an edge of the head pair switching signal 111, and the magnetic head having the second azimuth angle is used for the reproduction when the count value ranges from "−1TP" to "0".

Further, using an exclusive OR value of the preceding and following heads switching signal 112 and the head pair switching signal 111 as a memory switching signal 138 to be generated by the write controller 126, a video signal reproduced from the video track 129 recorded according to the first azimuth is written into the first field memory 121, and a video signal reproduced from the video track recorded according to the second azimuth is written into the second field memory 122.

Furthermore, In order to output the optimum field judgment result signal 137 in accordance with the timing when the video track and the scan of the magnetic head coincide with each other in a middle portion of the video track, the optimum field judgment result signal 137 is outputted for one filed interval at a first timing of a leading or trailing edge of the head pair switching signal 111, from a timing when the count value of the CAP-FG counter 139 becomes not smaller than the following threshold value Th1 or Th2:

(a) for the count value of the CAP-FG counter 139 being positive, $$Th1 = (TP/2) - (TP/n) - \beta \quad (16a);$$

and (b) for the count value of the CAP-FG counter 139 being negative, $$Th2 = -(TP/2) - (TP/n) - \beta \quad (16b).$$

In this case, $\beta$ is a constant determined depending on the speed mode or the tape speed of the magnetic tape. Further, the range of the constant $\beta$ is as follows:

(a) for n=even number, $$0 < \beta < (TP/n); \text{ and}$$

(b) for n=odd number, $$0 < \beta < (TP/2n).$$

In a manner as described above, the optimum field judgment result signal 137 is supplied to the write controller 126 in accordance with a scan timing when it is estimated that the video track and the magnetic head coincide with each other in the middle portion of the video track. Therefore a stable video signal having a smaller variation in level of reproduction for one field can be written into the first field memory 121 or the second field memory 122, whereby the reproduced video signal of one field can be reproduced from only one video track even in the slow-motion reproduction.

In this case, when the vertical synchronizing signal missing judgment circuit 116 judges that a vertical synchronizing signal is missing, the write controller 126 does not write the reproduced video signal into the field memories 121 or 122 even though the reproduced video signal is of the optimum field, namely, the level difference thereof is smaller. On the other hand, when the vertical synchronizing signal missing judgment circuit 116 judges that any vertical synchronizing signal is not missing, the write controller 126 writes the reproduced video signal into the field memories 121 or 122. This results in a slow-motion reproduction having no shift amount in the write position or write address.

Further, when the vertical synchronizing signal missing judgment circuit 116 judges that a vertical synchronizing signal is missing, the memory write reference signal generator 117 generates the memory write reference signal 135 in stead of the vertical synchronizing signal, and then supplies the generated memory write reference signal to the write clock and address generator 124, thereby preventing the write reference from being shifted and missing. This results in that the reproduced video signal of the optimum field or having smaller level difference can be written into the field memory 121 or 122 even though the vertical synchronizing signal is missing.

FIGS. 14A, 14B, 14C, 14D, 14E, 14F and 14G are timing charts showing a relationship among the head pair switching signal 111, the control signal 119 for tracking control, the CAP-FG signal 120, a count of the CAP-FG counter 139, the memory switching signal 138, the reproduced RF signal 128, and the optimum field judgment result signal 137 in the ½-time speed reproduction of the VTR of the second preferred embodiment shown in FIG. 11 in the forward direction.

Referring to FIGS. 14A through 14G, the memory switching signal 138 should be controlled so that the video signal is written into the first field memory 121 when the count value of the CAP-FG counter 139 ranges from "0" to "1TP" at a timing of a leading or trailing edge of the head pair switching signal 111, whereas the video signal is written into the second field memory 122 widen the count value of the CAP-FG counter 139 ranges from "−1TP" to "0" at a timing of a leading or trailing edge of the head pair switching signal 111. However, when the rotation of the rotating drum and the rotation of the capstan are out of phase, namely, there is a phase difference t100 between the head pair switching signal 111 and the control signal 119 as shown in FIGS. 14A and 14B, a shift amount between the video track and the scanning trace of the magnetic head increases while scan is continued, resulting in possibly failing in writing a stable video signal into each of the field memories 121 and 122.

In contrast to the above, FIGS. 15A through 15G show waveforms obtained in ½-time speed reproduction in the forward direction of the improved second preferred embodiment. In the improved second preferred embodiment, the count value of the CAP-FG counter 139 is reset to "0" at a timing tm31 of a leading or trailing edge of the CAP-FG signal 120 inputted first after the control signal 119 is inputted, and thereafter, the count value of the CAP-FG counter 139 is set from "1TP" to "−1TP" at a timing tm32 of a leading or trailing edge of the CAP-FG signal 120 when the CAP-FG signal 120 of the time interval corresponding to one video track pitch has been inputted. In this case, the reference numeral 138 denotes a memory switching signal, and the reference numeral 128 denotes a reproduced RF video signal.

When the rotation of the rotating drum and the run of the capstan are out of phase, the input timing of the above-mentioned head pair switching signal 111 is shifted from the input timing of the above-mentioned control signal 119. Therefore, in the timing shown in FIGS. 14A through 14G, the memory switching signal 138 is switched at the edge of the head pair switching signal 111 subsequent to the input of the control signal 119. On the other hand, in the case shown in FIGS. 15A through 15G, the following process is performed. When it is judged that the input timing of the control signal 119 is closer to the previous edge of the head pair switching signal 111 than the next edge of the head pair switching signal 111 by utilizing the CAP-FG counter 139, the memory switching signal 138 is switched over, for example, at a timing tm42, before the control signal 119 is inputted.

In more detail, since the count value of the CAP-FG counter 139 is (1TP/n) in between the edges of the head pair switching signal 111 in the 1/n times slow-motion reproduction, after a leading or trailing edge of the head pair switching signal 111, the reproduced video signal is written into the first field memory 121 when the count value CNT of the CAP-FG counter 139 is in the range from the following threshold value Th3 to the following threshold value Th4, whereas the reproduced video signal is written into the second field memory 122 when the count value CNT of the CAP-FG counter 139 is larger than the following threshold value Th4 and smaller than the following threshold value Th3:

$$Th3 = -TP/(2 \cdot n) \quad (17a);$$

and $Th4 = 1TP - 1TP/(2 \cdot n)$ (17b).

This results in that the reproduced video signal is stabilized as compared with the preferred embodiment shown in FIGS. 14A through 14G. Thus by writing a stabilized video image into each memory 121 or 122 even when the rotation of the rotating drum and the run of the capstan are out of phase in the slow-motion reproduction, there can be obtained an advantageous effect of allowing noise-free slow-motion reproduction to be achieved.

The VTR of the second preferred embodiment operates in a manner similar to that of the first preferred embodiment, except for the optimum field judgment circuit 136 and the process of the write controller 126.

The polarities of High or Low of various kinds of signals in each of the above-mentioned preferred embodiments do not limit the scope of the present invention, and each quantity of delay can be subject to a variety of addition, modification, and replacement within the spirit and claims of the present invention.

Although each of the above-mentioned preferred embodiments discloses the case where a video signal recorded with an azimuth angle is reproduced using the magnetic head, it is of course possible to execute the same operation as described above by means of two magnetic heads and two preamplifiers in a VTR having a recording format with no azimuth angle.

With the above-mentioned arrangement, the present invention can provide a magnetic recording and reproducing apparatus such as a VTR capable of performing slow-motion reproduction with a higher quality of image up to a speed one half of the normal reproduction speed in either of the forward and reverse directions without employing any magnetic head having a special movement mechanism.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recording and reproducing apparatus for reproducing a video signal recorded on a video track of a magnetic tape by means of a pair of magnetic heads arranged in a rotation drum so as to oppose to each other at an angle of 180 degrees, while rotating a capstan for moving said magnetic tape in the longitudinal direction thereof, comprising:

two memories each for storing a video signal of at least one field;

memory control means for controlling the reproduced video signal to be written into and be read out from said two memories;

reproduced video signal supply means for supplying a reproduced video signal reproduced from the magnetic tape by means of said pair of magnetic heads to said two memories;

control signal reproducing means for reproducing a control signal for tracking control recorded on the magnetic tape;

capstan frequency generating signal generating means for generating a capstan frequency generating signal in synchronous with rotation of said capstan; and optimum field judgment means for judging a time interval including a timing when a scanning trace of each of said pair of magnetic heads coincides with the video track in the vicinity of the center of the video track based on a head pair switching signal for switching over between said pair of magnetic heads, said control signal, and said capstan frequency generating signal, and supplying a judgment signal representing the time interval;

wherein, when the magnetic tape is continuously moved in a forward or reverse direction at a speed slower than a normal reproduction speed, said memory control means controls the reproduced video signal of one field to be written into one of said two memories for the time interval represented by the judgment signal supplied by said optimum field judgment means, whereas said memory control means simultaneously controls the reproduced video signal of another one field to be read out from another one of said two memories.

2. The magnetic recording and reproducing apparatus as claimed in claim 1, wherein video signals recorded on adjacent video tracks are reproduced respectively by means of a pair of magnetic heads having azimuth angles different from each other, and wherein said reproduced video signal supply means supplies to either one of said two memories the reproduced video signal on the video track reproduced by each of said pair of magnetic heads having the same azimuth angle as that of the video track to be scanned among said pair of magnetic heads.

3. The magnetic recording and reproducing apparatus as claimed in claim 2, wherein the video signal recorded on the video track of the magnetic tape includes a first field and a second field, wherein said two memories include a first memory and a second memory, said magnetic recording and reproducing apparatus comprising:

framing detection means for detecting whether the reproduced video signal is of the first field or the second field and supplying a signal representing the detection result, wherein said memory control means allows the reproduced video signal to be written into the first field memory when it is detected by said framing detection means that the reproduced video signal is of the first field, whereas said memory control means allows the reproduced video signal to be written into the second field memory when it is detected by said framing detection means that the reproduced video signal is of the second field.

4. The magnetic recording and reproducing apparatus as claimed in claim 2, further comprising:

synchronizing signal separating means for separating a vertical synchronizing signal from the reproduced video signal and supplying the separated vertical synchronizing signal to said memory control means; and memory read reference signal supply means for generating and supplying to said memory control means, a memory read reference signal periodically in synchronous with said vertical synchronizing signal;

wherein said memory control means controls the reproduced video signal to be written to said two memories based on the vertical synchronizing signal separated by said vertical synchronizing signal generating means, and simultaneously controls the reproduced video signal to be read out from said two memories based on said memory read reference signal.

5. The magnetic recording and reproducing apparatus as claimed in claim 2, further comprising:

synchronizing signal separating means for separates a vertical synchronizing signal from the reproduced video signal and supplying the separated vertical synchronizing signal to said memory control means; and vertical synchronizing signal missing judgment means for judging Whether or not the vertical synchronizing signal separated by said synchronizing signal separating means is missing;

wherein said memory control means controls the reproduced video signal to be written into one of said two memories only when said vertical synchronizing signal missing judgment means judges that the vertical synchronizing signal is not missing.

6. The magnetic recording and reproducing apparatus as claimed in claim 1, wherein one of said pair of magnetic heads includes a first head having a first azimuth angle and a second head having a second azimuth angle different from the first azimuth angle, said first and second heads being mounted on said rotation drum so that said second head is positioned so as to precede said first head, wherein another one of said pair of magnetic heads includes a third head having the first azimuth angle and a fourth head having the second azimuth angle, said third and fourth heads being mounted on said rotation drum so that said third head is positioned so as to oppose to said second head at an angle of 180 degrees and said fourth head is positioned so as to oppose to said first head at an angle of 180 degrees, said magnetic recording and reproducing apparatus comprising:

preceding and following heads switching signal generating means for generating a preceding and following heads switching signal for switching over between a pair of preceding heads including said second and third heads and a pair of following heads including said first and fourth heads; and selecting means for selecting one of the video signals respectively reproduced by said first, second, third and fourth heads, and supplying the selected video signal to said two memories;

wherein, in response to a combination of azimuth information of the video track to be scanned and said head pair switching signal, said selecting means controls said preceding and following heads switching signal generating means to generate said preceding and following heads switching signal so that the video signal reproduced by the magnetic head having the same azimuth angle as that of the video track to be scanned.

7. The magnetic recording and reproducing apparatus as claimed in claim 6, wherein the video signal recorded on the video track of the magnetic tape includes a first field and a second field, wherein said two memories include a first memory and a second memory, said magnetic recording and reproducing apparatus comprising:

framing detection means for detecting whether the reproduced video signal is of the first field or the second field and supplying a signal representing the detection result, wherein said memory control means allows the reproduced video signal to be written into the first field memory when it is detected by said framing detection means that the reproduced video signal is of the first field, whereas said memory control means allows the reproduced video signal to be written into the second field memory when it is detected by said framing detection means that the reproduced video signal is of the second field.

8. The magnetic recording and reproducing apparatus as claimed in claim 6, further comprising:

synchronizing signal separating means for separating a vertical synchronizing signal from the reproduced video signal and supplying the separated vertical synchronizing signal to said memory control means; and memory read reference signal supply means for generating and supplying to said memory control means, a memory read reference signal periodically in synchronous with said vertical synchronizing signal;

wherein said memory control means controls the reproduced video signal to be written to said two memories based on the vertical synchronizing signal separated by said vertical synchronizing signal generating means, and simultaneously controls the reproduced video signal to be read out from said two memories based on said memory read reference signal.

9. The magnetic recording and reproducing apparatus as claimed in claim 6, further comprising:

synchronizing signal separating means for separates a vertical synchronizing signal from the reproduced video signal and supplying the separated vertical synchronizing signal to said memory control means; and vertical synchronizing signal missing judgment means for judging whether or not the vertical synchronizing signal separated by said synchronizing signal separating means is missing;

wherein said memory control means controls the reproduced video signal to be written into one of said two memories only when said vertical synchronizing signal missing judgment means judges that the vertical synchronizing signal is not missing.

10. The magnetic recording and reproducing apparatus as claimed in claim 6, further comprising:

synchronizing signal separating means for separates a vertical synchronizing signal from the reproduced video signal and supplying the separated vertical synchronizing signal to said memory control means;

vertical synchronizing signal missing judgment means for judging whether or not the vertical synchronizing signal separated by said synchronizing signal separating means is missing; and memory write reference signal generating means for generating a memory write reference signal as a reference when writing the reproduced video signal into said two memories and supplying the memory write reference signal to said memory control means;

wherein said memory write reference signal generating means outputs the vertical synchronizing signal as the memory write reference signal when said vertical synchronizing signal missing judgment means judges that the vertical synchronizing signal is not missing, whereas said memory write reference signal generating means generates the memory write reference signal using the head pair switching signal as a reference based on:

(a) a time difference between the vertical synchronizing signal detected in a previous time and the head pair switching signal in the previous time,
(b) a polarity of the preceding and following heads switching signal in the previous time,
(c) the current preceding and following heads switching signal, and
(d) a reproduction time difference generated due to a positional difference between the first and second heads, when said vertical synchronizing signal missing judgment means judges that the vertical synchronizing signal is missing.

11. The magnetic recording and reproducing apparatus as claimed in claim 10,
wherein, when said vertical synchronizing signal missing judgment means judges that the vertical synchronizing signal is missing, said memory write reference signal generating means generates the memory write reference signal using a previously detected vertical synchronizing signal as a reference-based on:
(a) a time difference between the adjacent two vertical synchronizing signals at a timing when the consecutive two vertical synchronizing signals are detected,
(b) a polarity of the preceding and following heads switching signal in said timing,
(c) the current preceding and following heads switching signal, and
(d) a reproduction time difference generated due to the positional difference between the first and second heads.

12. The magnetic recording and reproducing apparatus as claimed in claim 1,
wherein the video signal recorded on the video track of the magnetic tape includes a first field and a second field,
wherein said two memories include a first memory and a second memory,
said magnetic recording and reproducing apparatus comprising:
framing detection means for detecting whether the reproduced video signal is of the first field or the second field and supplying a signal representing the detection result,
wherein said memory control means allows the reproduced video signal to be written into the first field memory when it is detected by said framing detection means that the reproduced video signal is of the first field, whereas said memory control means allows the reproduced video signal to be written into the second field memory when it is detected by said framing detection means that the reproduced video signal is of the second field.

13. The magnetic recording and reproducing apparatus as claimed in claim 12,
wherein, when the detection result of said framing detection means is changed in scanning the same video track, the framing detection means prohibits the change of the detection result of the framing detection means until the video track being scanned is changed, and inverts the detection result thereof when the video track being scanned is changed.

14. The magnetic recording and reproducing apparatus as claimed in claim 13, further comprising:
synchronizing signal separating means for separating a vertical synchronizing signal from the reproduced video signal and supplying the separated vertical synchronizing signal to said memory control means; and
memory read reference signal supply means for generating and supplying to said memory control means, a memory read reference signal periodically in synchronous with said vertical synchronizing signal;
wherein said memory control means controls the reproduced video signal to be written to said two memories based on the Vertical synchronizing signal separated by said vertical synchronizing signal generating means, and simultaneously controls the reproduced video signal to be read out from said two memories based on said memory read reference signal.

15. The magnetic recording and reproducing apparatus as claimed in claim 13, further comprising:
synchronizing signal separating means for separates a vertical synchronizing signal from the reproduced video signal and supplying the separated vertical synchronizing signal to said memory control means; and
vertical synchronizing signal missing judgment means for judging whether or not the vertical synchronizing signal separated by said synchronizing signal separating means is missing;
wherein said memory control means controls the reproduced video signal to be written into one of said two memories only when said vertical synchronizing signal missing judgment means judges that the vertical synchronizing signal is not missing.

16. The magnetic recording and reproducing apparatus as claimed in claim 12, further comprising:
synchronizing signal separating means for separating a vertical synchronizing signal from the reproduced video signal and supplying the separated vertical synchronizing signal to said memory control means; and
memory read reference signal supply means for generating and supplying to said memory control means, a memory read reference signal periodically in synchronous with said vertical synchronizing signal;
wherein said memory control means controls the reproduced video signal to be written to said two memories based on the vertical synchronizing signal separated by said vertical synchronizing signal generating means, and simultaneously controls the reproduced video signal to be read out from said two memories based on said memory read reference signal.

17. The magnetic recording and reproducing apparatus as claimed in claim 12, further comprising:
synchronizing signal separating means for separates-a vertical synchronizing signal from the reproduced video signal and supplying the separated vertical synchronizing signal to said memory control means; and
vertical synchronizing signal missing judgment means for judging whether or not the vertical synchronizing signal separated by said synchronizing signal separating means is missing;
wherein said memory control means controls the reproduced video signal to be written into one of said two memories only when said vertical synchronizing signal missing judgment means judges that the vertical synchronizing signal is not missing.

18. The magnetic recording and reproducing apparatus as claimed in claim 1, further comprising:
synchronizing signal separating means for separating a vertical synchronizing signal from the reproduced video signal and supplying the separated vertical synchronizing signal to said memory control means; and
memory read reference signal supply means for generating and supplying to said memory control means, a memory read reference signal periodically in synchronous with said vertical synchronizing signal;

wherein said memory control means controls the reproduced video signal to be written to said two memories based on the vertical synchronizing signal separated by said vertical synchronizing signal generating means, and simultaneously controls the reproduced video signal to be read out from said two memories based on said memory read reference signal.

19. The magnetic recording and reproducing apparatus as claimed in claim 18, further comprising:

synchronizing signal separating means for separates a vertical synchronizing signal from the reproduced video signal and supplying the separated vertical synchronizing signal to said memory control means; and vertical synchronizing signal missing judgment means for judging whether or not the vertical synchronizing signal separated by said synchronizing signal separating means is missing;

wherein said memory control means controls the reproduced video signal to be written into one of said two memories only when said vertical synchronizing signal missing judgment means judges that the vertical synchronizing signal is not missing.

20. The magnetic recording and reproducing apparatus as claimed in claim 18, wherein said memory read reference signal includes a first signal representing that the reproduced video signal is of the first field and a second signal representing that the reproduced video signal is of the second field, wherein said memory control means comprises read control means for controlling a timing for reading out the reproducing video signal from said two memories with reference to said memory read reference signal, to be shifted by one period of the horizontal synchronizing signal, based on a combination of the field of the reproduced video signal and the first or second signal of the memory read reference signal.

21. The magnetic recording and reproducing apparatus as claimed in claim 20, further comprising:

synchronizing signal separating means for separates a vertical synchronizing signal from the reproduced video signal and supplying the separated vertical synchronizing signal to said memory control means; and vertical synchronizing signal missing judgment means for judging whether or not the vertical synchronizing signal separated by said synchronizing signal separating means is missing;

wherein said memory control means controls the reproduced video signal to be written into one of said two memories only when said vertical synchronizing signal missing judgment means judges .that the vertical synchronizing signal is not missing.

22. The magnetic recording and reproducing apparatus as claimed in claim 1, further comprising:

synchronizing signal separating means for separates a vertical synchronizing signal from the reproduced video signal and supplying the separated vertical synchronizing signal to said memory control means; and vertical synchronizing signal missing judgment means for judging whether or not the vertical synchronizing signal separated by said synchronizing signal separating means is missing;

wherein said memory control means controls the reproduced video signal to be written into one of said two memories only when said vertical synchronizing signal missing judgment means judges that the vertical synchronizing signal is not missing.

23. The magnetic recording and reproducing apparatus as claimed in claim 1, wherein said optimum field judgment means judges the time interval when the count value of the said capstan frequency generating signal is equal to or larger than either one of:

(a) $(TP/2)-(TP/n)-\beta$, and (b) $-(TP/2)-(TP/n)-\beta$, at a first timing from an edge of a head pair switching signal for switching over between said pair of magnetic heads, where TP is the count value of said counter for a time interval of one track pitch which is a distance in the longitudinal direction of the magnetic tape between adjacent video tracks, 1/n is the number of times of the tape speed in a slow-motion reproduction as compared from the tape speed of a normal reproduction, and $\beta$ is a constant determined depending on the number 1/n of the times of the tape speed in the slow-motion reproduction.

24. The magnetic recording and reproducing apparatus as claimed in claim 23, further comprising:

control signal reproducing means for reproducing a control signal for tracking control recorded on the magnetic tape;

wherein said counter is reset to zero at a first timing of an edge of the capstan frequency generating signal after the control signal is reproduced, and said counter is set from 1TP to −1TP when the capstan frequency generating signal of one track pitch has been generated by said capstan frequency signal generating means after said counter is reset to zero, and wherein said memory control means controls the reproduced video signal to be written into each of said two memories for one field at the timing determined based on the count value of said counter.

\* \* \* \* \*